(12) United States Patent
Power et al.

(10) Patent No.: US 11,546,621 B2
(45) Date of Patent: Jan. 3, 2023

(54) METHODS, SYSTEMS, APPARATUS, AND ARTICLES OF MANUFACTURE TO IDENTIFY FEATURES WITHIN AN IMAGE

(71) Applicant: Movidius Limited, Schiphol-Rijk (NL)

(72) Inventors: Martin Power, Dublin (IE); Brendan Barry, Dublin (IE); Vasile Toma, II, Timișoara (RO)

(73) Assignee: Movidius Limited, Schiphol-Rijk (NL)

( * ) Notice: Subject to any disclaimer, the term of this patent is extended or adjusted under 35 U.S.C. 154(b) by 0 days.

(21) Appl. No.: 17/433,895

(22) PCT Filed: Feb. 26, 2019

(86) PCT No.: PCT/EP2019/054765
§ 371 (c)(1),
(2) Date: Aug. 25, 2021

(87) PCT Pub. No.: WO2020/173556
PCT Pub. Date: Sep. 3, 2020

(65) Prior Publication Data
US 2022/0109862 A1    Apr. 7, 2022

(51) Int. Cl.
*H04N 19/436* (2014.01)
*H04N 19/176* (2014.01)
*H04N 19/517* (2014.01)

(52) U.S. Cl.
CPC ......... *H04N 19/436* (2014.11); *H04N 19/176* (2014.11); *H04N 19/517* (2014.11)

(58) Field of Classification Search
CPC ....... G06T 2200/28; G06T 2207/10016; G06T 2207/20021; G06T 7/231; H04N 19/176; H04N 19/43; H04N 19/436; H04N 19/51; H04N 19/517
See application file for complete search history.

(56) References Cited

U.S. PATENT DOCUMENTS

| 6,249,550 B1* | 6/2001 | Mizuno | H04N 5/145 |
|  |  |  | 348/E5.066 |
| 2011/0170611 A1* | 7/2011 | Lai | H04N 19/51 |
|  |  |  | 375/E7.026 |

OTHER PUBLICATIONS

Z. Liu, S. Goto and T. Ikenaga, "Optimization of Propagate Partial SAD and SAD tree motion estimation hardwired engine for H.264," 2008 IEEE International Conference on Computer Design, 2008, pp. 328-333, doi: 10.1109/ICCD.2008.4751881.*

(Continued)

*Primary Examiner* — Mohammed S Rahaman
(74) *Attorney, Agent, or Firm* — Hanley, Flight & Zimmerman, LLC

(57) ABSTRACT

Methods, systems, apparatus and articles of manufacture to identify features within an image are disclosed herein. An example apparatus includes a horizontal cost (HCOST) engine to apply a first row of pixels of a macroblock to an input of a first HCOST unit, the first HCOST unit including a number of difference calculators; and a difference calculator engine to apply corresponding rows of pixels of a search window of a source image to corresponding ones of the number of difference calculators of the first HCOST unit, the corresponding ones of the number of difference calculators to calculate respective sums of absolute difference (SAD) values between (a) the first row of pixels of the macroblock and (b) the corresponding rows of pixels of the search window.

16 Claims, 18 Drawing Sheets

(56) References Cited

OTHER PUBLICATIONS

Ching-Yeh Chen, Shao-Yi Chien, Yu-Wen Huang, Tung-Chien Chen, Tu-Chih Wang and Liang-Gee Chen, "Analysis and architecture design of variable block-size motion estimation for H.264/AVC," in IEEE Transactions on Circuits and Systems I: Regular Papers, vol. 53, No. 3, pp. 578-593, Mar. 2006, doi: 10.1109/TCSI.2005.*

K. .-M. Yang, M. .-T. Sun and L. Wu, "A family of VLSI designs for the motion compensation block-matching algorithm," in IEEE Transactions on Circuitsand Systems, vol. 36, No. 10, pp. 1317-1325, Oct. 1989, doi: 10.1109/31.44348.*

International Searching Authority, "International Search Report," mailed in connection with International Patent Application No. PCT/EP2019/054765, dated Nov. 19, 2019, 4 pages.

International Searching Authority, "Written Opinion," mailed in connection with International Patent Application No. PCT/EP2019/054765, dated Nov. 19, 2019, 15 pages.

Yang et al., "A Family of VLSI Designs for the Motion Compensation Block-Matching Algorithm," IEEE Transactions on Circuits and Systems, vol. 36, No. 10, Oct. 1989, 9 pages.

Chen et al., "Analysis and Architecture Design of Variable Block-Size Motion Estimation for H.264/AVC," IEEE Transactions on Circuits and Systems, vol. 53, No. 2, Feb. 2006, 16 pages.

Liu et al., "Optimization of Propagate Partial SAD and SAD Tree Motion Estimation Hardwired Engine for H.264," IEEE, 2008, 6 pages.

European Patent Office, "Communication Pursuant to Rules 161(1) and 162 EPC," mailed in connection with EP Patent Application No. 19709395.8, dated May 10, 2021, 3 pages.

International Searching Authority, "International Preliminary Report on Patentability", mailed in connection with International Patent Application No. PCT/EP2019/054765, dated Aug. 25, 2021, 13 pages.

* cited by examiner

METHODS, SYSTEMS, APPARATUS, AND ARTICLES OF MANUFACTURE TO IDENTIFY FEATURES WITHIN AN IMAGE

CROSS-REFERENCE TO RELATED APPLICATION

This patent application arises from a 371 nationalization of PCT Patent Application No. PCT/EP2019/054765, entitled "METHODS, SYSTEMS, APPARATUS, AND ARTICLES OF MANUFACTURE TO IDENTIFY FEATURES WITHIN AN IMAGE," and which was filed on Feb. 26, 2019. PCT Patent Application No. PCT/EP2019/054765 is hereby incorporated herein by reference in its entirety. Priority to PCT Patent Application No. PCT/EP2019/054765 is hereby claimed.

FIELD OF THE DISCLOSURE

This disclosure relates generally to image searching, and, more particularly, to methods, systems, apparatus, and articles of manufacture to identify features within an image.

BACKGROUND

In recent years, vision systems have introduced large quantities of image data to computational resources for one or more analysis operations. The large quantities of image data include ever increasing bandwidth expectations for state-of-the-art consumer electronics products, such as high-definition television systems. In some examples, the analysis operations on the image data attempt to identify whether movement is occurring in one or more source images.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
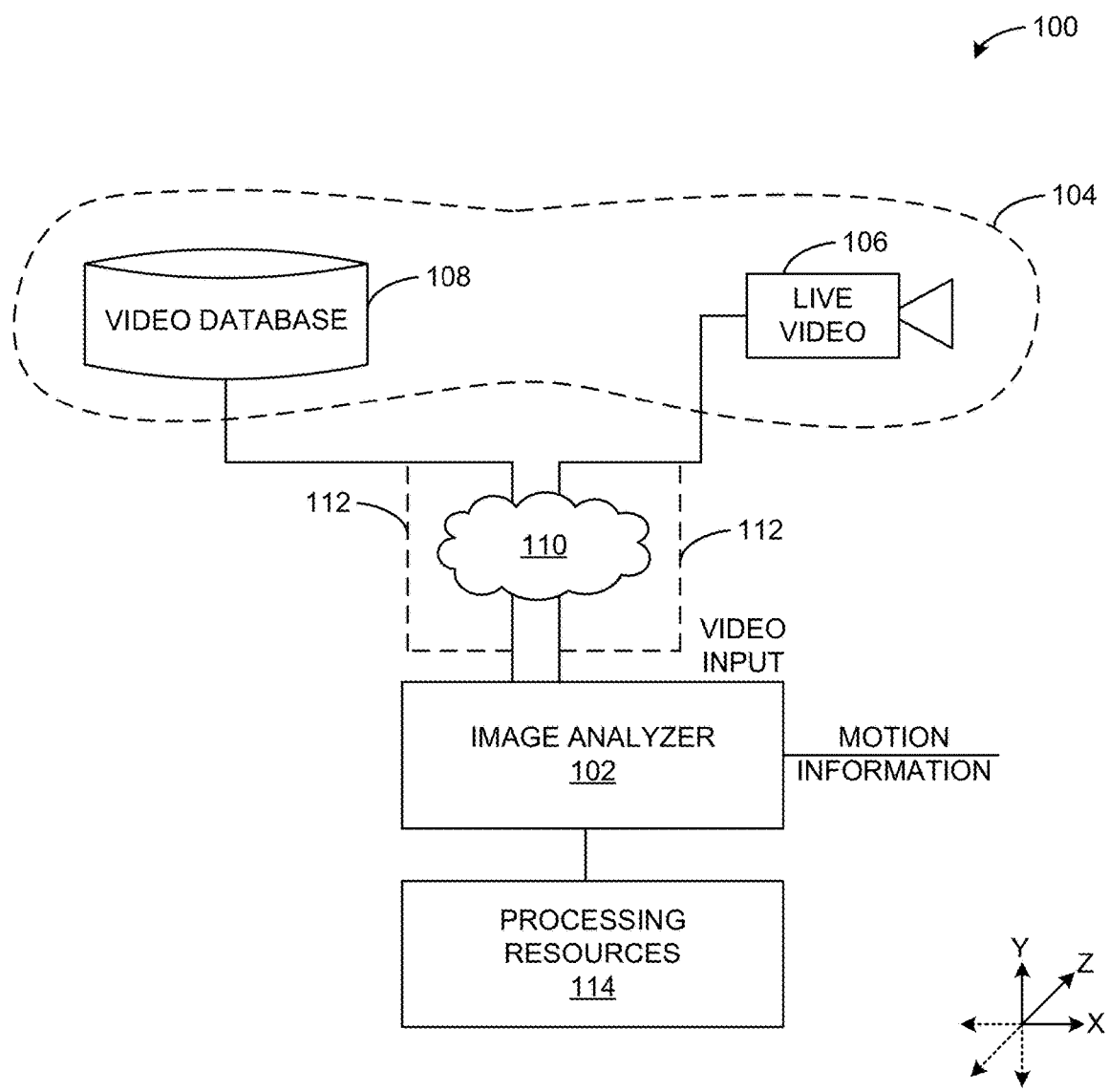
FIG. 1 is a schematic illustration of an example image analysis system structured to identify features within an image.

Calculating and/or otherwise determining an occurrence of motion in an image is computationally intense. In particular, during a first instance of time a source image is analyzed with a reference image to identify a relative location within the source image in which the reference image is located. However, the source image may be dynamic, such as a live feed from a high-definition (e.g., 1080p, 4k, etc.) source (e.g., a camera, a memory, a database, etc.). As such, the source image is analyzed at a second instance of time to identify a second relative location within the source image in which the reference image may be located. Information corresponding to a difference in pixel locations of the reference image at the first instance of time and the second instance of time is indicative of a direction and/or speed of object motion.

To illustrate further, consider the source image to be a framed scene of a road that includes a vehicle, in which the vehicle is moving. During the first instance of time there is no information that would indicate whether the vehicle is moving (because there are no prior pixel locations associated with a reference image that can be used for relative location difference calculations). Additionally, there is no information that would indicate what direction the vehicle is moving. However, if the reference image is selected and/or otherwise designated as a portion of the vehicle (e.g., one wheel of the vehicle), then motion of the vehicle is confirmed at a second instance of time if that same reference image (e.g., the wheel) is located in a second (different) relative location of the framed scene. Additionally, directional change information associated with an object of interest in the source image may be determined based on analysis of relative pixel value changes in a coordinate system (e.g., a Cartesian coordinate system having +/− x-axis pixel locations, +/− y-axis pixel locations and/or +/− z-axis pixel locations).

Changes to the source image may occur at ever increasing rates in view of updated video standards. For instance, a 4k video feed (e.g., a traffic camera monitoring system, or 4k Ultra High Definition (UHD) for television broadcast) is 3,840 pixels across (e.g., x-axis) and 2,160 pixels high (e.g., y-axis). Additionally, video cameras include corresponding frame rates, such as 30 frames-per-second (fps), 60 fps, etc. In the event of a 30 fps camera, a corresponding duration to process a retrieved and/or otherwise acquired image is 30 milliseconds (ms). As such, after a first instance of time in which an image is acquired, that image must be searched and compared to the reference image (e.g., the image of a vehicle wheel) to determine its relative location. Stated differently, the source image is acquired, gets written to a memory, post processed (e.g., increase/decrease brightness levels), retrieved from the memory, and the reference image (or in some cases, two or more reference images) is moved around the source image to compare against pixels/kernels within the image to find a region of the image that is most similar to the reference image. A degree of similarity is measured by way of an absolute difference, but other difference techniques may be used (within 30 ms for a 30 fps camera). In the event of a relatively lowest difference value, then a match is confirmed corresponding to the pixel locations (e.g., x and y coordinate locations of a pixel grid) in which that lowest difference value was detected. As used herein, a "match" is based on a relative lowest difference value even when pixel comparisons do not match 100%.

Apparatus, methods, systems and articles of manufacture disclosed herein improve a computational efficiency when identifying features within one or more images of interest. Examples disclosed herein include structural arrangements of difference calculators and groupings (quantities) of such difference calculators that eliminate particular circuitry associated with previous techniques to identify matching pixel(s) within a source image of interest. Additionally, examples disclosed herein reduce a computational burden required by hardware that identifies such matching pixel(s), as described in further detail below.

FIG. 1 is a schematic illustration of an example image analysis system 100 structured to identify features within an image in a manner consistent with the teachings of this patent. In the illustrated example of FIG. 1, the image analysis system 100 includes an example image analyzer 102 communicatively connected to image (e.g., images from one or more photos, video, etc.) sources 104, which may include example camera(s) 106, example database(s) 108, etc. In some examples, the video sources 104 are communicatively connected to the image analyzer 102 via a network 110, while in other examples the video sources 104 include a direct connection 112. The example image analyzer 102 may include one or more processing resources of its own and/or, in some examples, the image analyzer 102 may engage processing services from processing resources 114. Example processing resources 114 include, but are not limited to computers, servers, cloud-based server farms (e.g., Amazon Web Services (AWS), Rackspace Cloud, Google Cloud, Microsoft Azure, etc.), field-programmable gate arrays (FPGAs) and/or application-specific integrated circuits (ASICs).

Based on video input data, the example image analyzer 102 identifies location information (e.g., relative location information) associated with one or more pixels and/or portions of an image of interest. In some examples, the location information is indicative of motion within the image of interest, such as motion associated with a sub-image (e.g., a vehicle, a person, etc.) within the image of interest.

Figure 2:
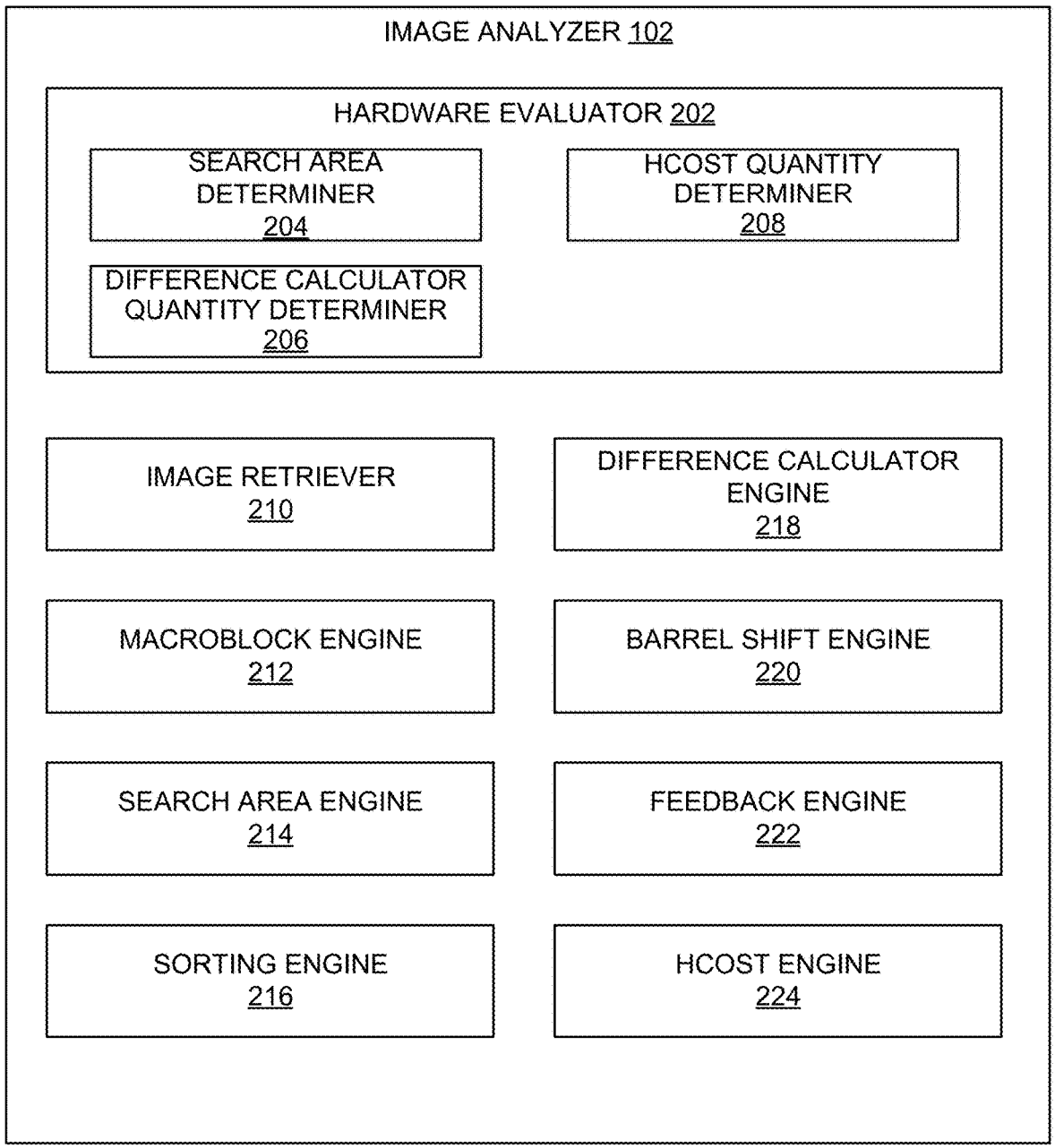
FIG. 2 is a schematic illustration of an example image analyzer of the image analysis system of FIG. 1 to identify features within an image.

FIG. 2 is a schematic illustration of the example image analyzer 102 of FIG. 1. In the illustrated example of FIG. 2, the example image analyzer 102 includes an example hardware evaluator 202. The example hardware evaluator 202 includes an example search area determiner 204, an example difference calculator quantity determiner 206, and an example horizontal cost (HCOST) quantity determiner 208. The example image analyzer 102 of FIG. 2 also includes an example image retriever 210, an example macroblock engine 212, an example search area engine 214, an example sorting engine 216, an example difference calculator engine 218, an example barrel shift engine 220, an example feedback engine 222, and an example HCOST engine 224. In this example, the HCOST engine 224 implements means for macroblock pixel applying. The means for macroblock pixel applying may additionally or alternatively be implemented by macroblock pixel applying means. In this example, the difference calculator engine 218 implements means for search window applying. The means for search window applying may additionally or alternatively be implemented by a search window applying means. In this example, the difference calculator quantity determiner 206 implements means for determining difference calculator quantities. The means for determining difference calculator quantities may additionally or alternatively be implemented by a determining difference calculator quantities means. In this example, the search area engine 214 implements a means for search area evaluation. The means for search area evaluation may additionally or alternatively be implemented by a search area evaluation means. In this example, the sorting engine 216 implements a means for sorting. The means for sorting may additionally or alternatively be implemented by a sorting means.

Figure 3A:
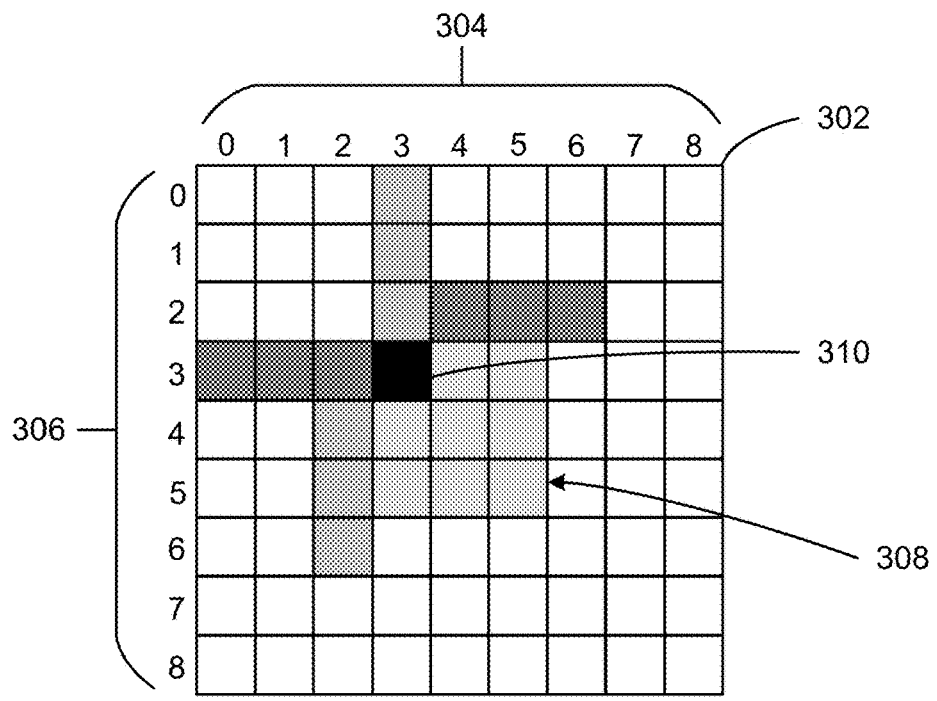
FIGS. 3A and 3B are example search areas evaluated by the example image analyzer of FIGS. 1 and 2.

Examples disclosed herein consider the example image analyzer 102 of FIGS. 1 and/or 2 in connection with a search area of 9-pixels (x-direction) by 9-pixels (y-direction) and a 3-pixel by 3-pixel macroblock being searched for therein. However, the example 9×9 search area and/or example 3×3 macroblock are discussed herein as a matter of convenience and not limitation. The example search area of 9-pixels (x-direction) by 9-pixels (y-direction) are referred to herein as a 9×9 search area, as shown in FIG. 3A. In the illustrated example of FIG. 3A, the 9×9 search area 302 includes an x-direction 304 and a y-direction 306. In some examples, the search area is referred-to herein as a search window. The particular pixel size of the search area 302 is determined based on a selected search span value, in which the search span value indicates a number of pixels around a macroblock location that will be searched. To illustrate, the illustrated example of FIG. 3A includes a macroblock 308 that has dimensions of 3-pixels (x-direction) by 3-pixels (y-direction). The example macroblock 308 includes a reference pixel 310 (e.g., a top-left pixel of the example macroblock 308) that can move three (3) pixels in any direction during a search instance within the 9×9 search area. As described in further detail below, the example macroblock 308 (e.g., the example sub-image referred-to above) includes pixels to be searched in a digital image (e.g., the image of interest) and/or a portion of the digital image, such as the example search area 302. For example, the image of interest may be a scene having a vehicle, in which the scene could be one of many scenes that form a movie or a live image. Continuing with the aforementioned example, the macroblock 308 may be a portion of the vehicle (e.g., a wheel) that is used to search the scene. In the event the portion of the vehicle (e.g., the wheel) is identified in the scene at a first time corresponding to first pixel locations (e.g., a lower left region of the image of interest), and the portion of the vehicle is identified in the scene at a second time corresponding to second pixel locations (e.g., a lower right region of the image of interest), then an indication of object movement can be determined (e.g., the vehicle is travelling from left to right in the image of interest/scene).

Figure 3B:
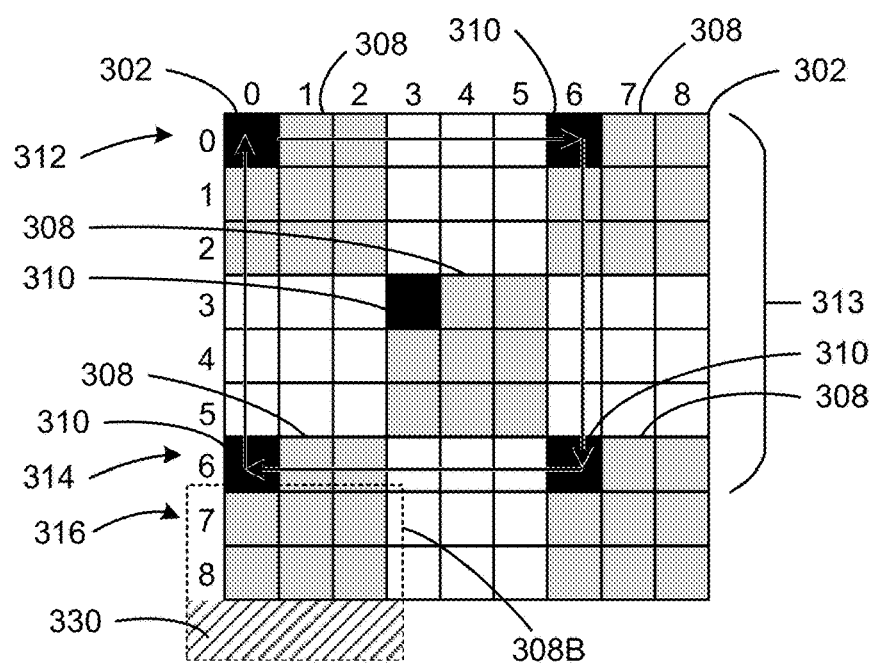

To illustrate a resulting search area, FIG. 3B illustrates the example search area 302 having a number of individual reference macroblocks 308 situated therein. The number of individual reference macroblocks 308 are situated in a manner where a complete macroblock (e.g., 3×3 pixel macroblock) is able to fit within the search when the example reference pixel 310 has a top-left position within the search area 302. In a first row 312 of the example search area 302, the example macroblock 308 can be positioned in seven (7) different locations in which the example reference pixel 310 has a top-left position of the first row 312 and the full macroblock 308 fits within the 9×9 search area 302. Additionally, seven (7) rows (see rows 313) of macroblocks can fit within the example 9×9 search area 302, thereby resulting in forty-nine (49) possible macroblock locations in the search area that need to be evaluated (prior to one or more additional search areas being searched for a match of the reference macroblock). In operation, because the macroblock is the reference image (e.g., the wheel of the vehicle) being searched-for in the image of interest (the example 9×9 search area 302), each one of the 49 locations of the search area results in a pixel comparison to determine a degree of similarity. The pixel comparison occurs between (a) the macroblock pixels and (b) the image of interest pixels at that relative location of the search area 302. As described in further detail below, each of the example 49 locations will result in a numeric comparison difference value such that difference values having a relatively closer sum equal to zero are deemed to be a closer match.

Figure 3C:
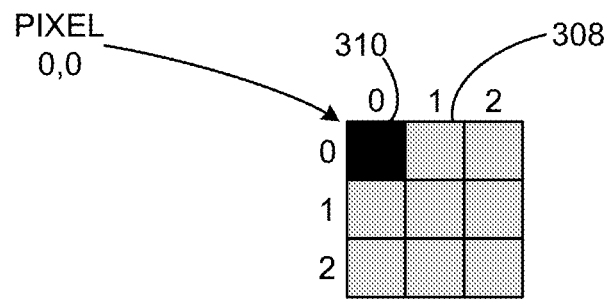
FIGS. 3C and 3D are example macroblocks indicative of pixels to be searched in the example search areas of FIGS. 3A and 3B.
Figure 3D:
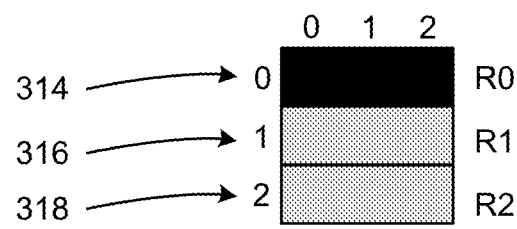

FIG. 3C illustrates further detail of the example macroblock 308. In the illustrated example of FIG. 3C, the macroblock 308 includes the reference pixel 310 at pixel location (0,0), and the macroblock 308 is 3-pixels wide by 3-pixels tall (high). FIG. 3D illustrates further detail of the example macroblock 308 in which a first row 314 is labeled and/or otherwise designated as reference "R0," a second row 316 is labeled and/or otherwise designated as reference "R1," and a third row 318 is labeled and/or otherwise designated as reference "R2."

In a first mode of operation of the example image analyzer 102, the example hardware evaluator 202 determines whether hardware parameters are known. As used herein, hardware parameters refer to example types and/or quantities of: computer processing units (CPUs), graphics processing units (GPUs), difference calculators (sometimes referred to herein as comparison sum-of-absolute-difference (CSAD) units), accumulators, horizontal cost (HCOST) units, compare units, etc. Generally speaking, the example image analyzer 102 of FIGS. 1 and/or 2 enable improved efficiency when identifying features within an image by, in part, employing particular operations of particular hardware configurations/arrangements. Examples disclosed herein consider image processing for a search area having a particular number of x-direction pixels and a particular number of y-direction pixels, but examples disclosed herein are not limited thereto.

Figure 4:
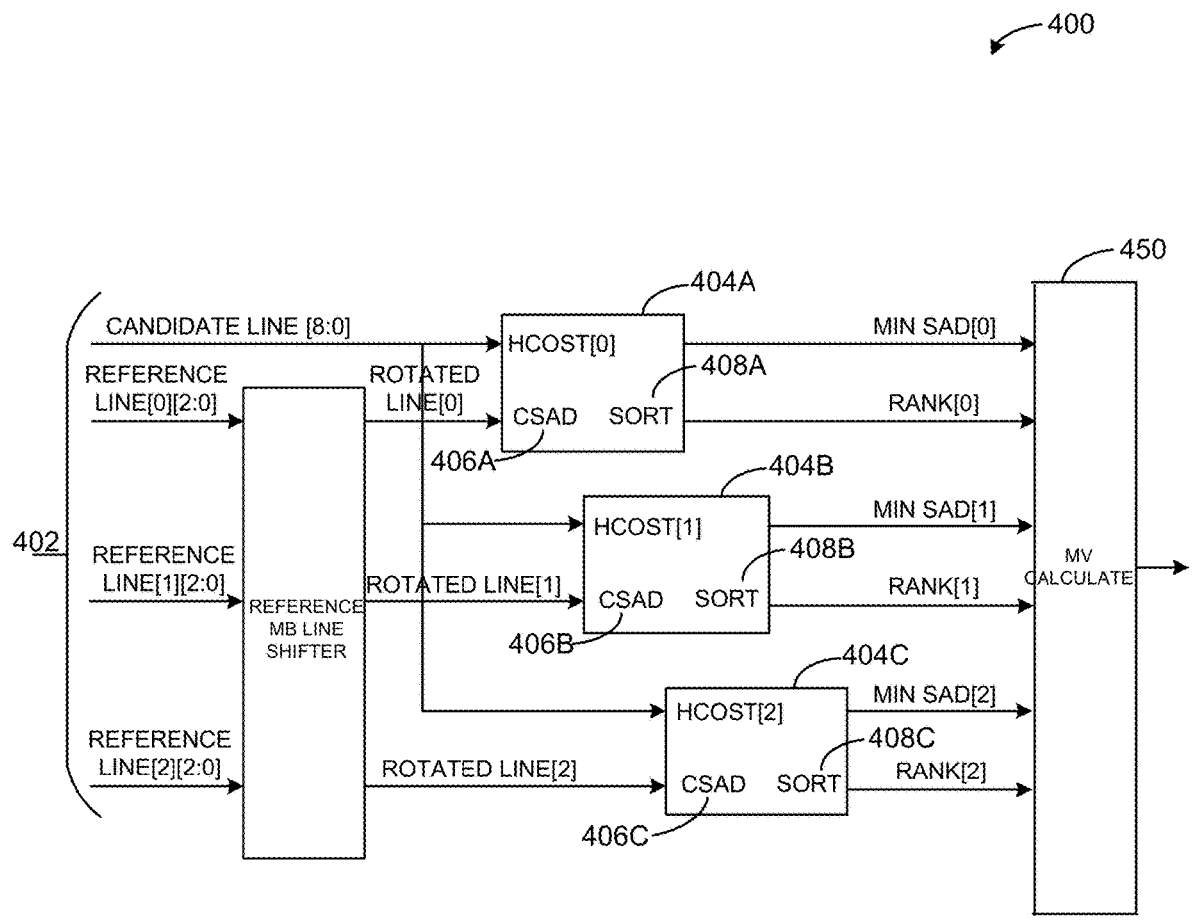
FIG. 4 is a schematic illustration of an example first compare unit of the example image analysis system of FIG. 1.

For example, improved efficiency when identifying features within an image is achieved by examples disclosed herein by an example first compare unit 400 shown in the illustrated example of FIG. 4. In some examples, the first compare unit 400 is hardware located in the example processing resources 114 of FIG. 1, while in some examples the first compare unit 400 is hardware located in the example image analyzer 102. In some examples, the first compare unit 400 is an application-specific integrated circuit (ASIC), while in some examples the first compare unit 400 is one or more field-programmable gate array (FPGA) resources. In some examples, the image analyzer 102 invokes particular FPGA resources in a manner consistent with input characteristics (e.g., resolution values of the example video sources 104, pixel window search area constraints/settings, frame rate expectations of an application, etc.).

In the illustrated example of FIG. 4, the first compare unit 400 includes pixel inputs 402 that include pixel data from example image (e.g., video) sources 104 of FIG. 1 and/or the example image retriever 210 of FIG. 2. Respective ones of the pixel inputs 402 that are associated with reference pixels are provided as inputs to a barrel line shifter 410. As discussed in further detail below, the example barrel line shifter 410 arranges reference pixel inputs in a manner that permits comparisons and/or difference calculations to a source image during different clock cycle iterations of the image analyzer 102 and/or corresponding processing resources 114. The example first compare unit 400 of FIG. 3 includes horizontal cost (HCOST) units 404. Continuing with the above-identified example of a 3×3 reference macroblock 308 and the example 9×9 search area 302 (an example for purposes of explanation and not limitation), the illustrated example compare unit 400 of FIG. 4 includes an example first HCOST unit 404A, an example second HCOST unit 404B, and an example third HCOST unit 404C (generally referred to herein in the aggregate as HCOST units 404). In some examples, the quantity of HCOST units is based on a height of the reference macroblock, but other examples may be utilized with different degrees of optimization and/or efficiency. Each HCOST unit includes a quantity of CSAD units 406 (difference calculators) and a corresponding sorting unit 408. In an effort to maintain a consistent manner of structural reference to the illustrated example of FIG. 4, the example first HCOST unit 404A includes respective first CSAD units 406A and a first sorting unit 408A, the example second HCOST unit 404B includes respective second CSAD units 406B and a second sorting unit 408B, and the example third HCOST unit 404C includes respective third CSAD units 406C and a third sorting unit 408C.

Figure 5:
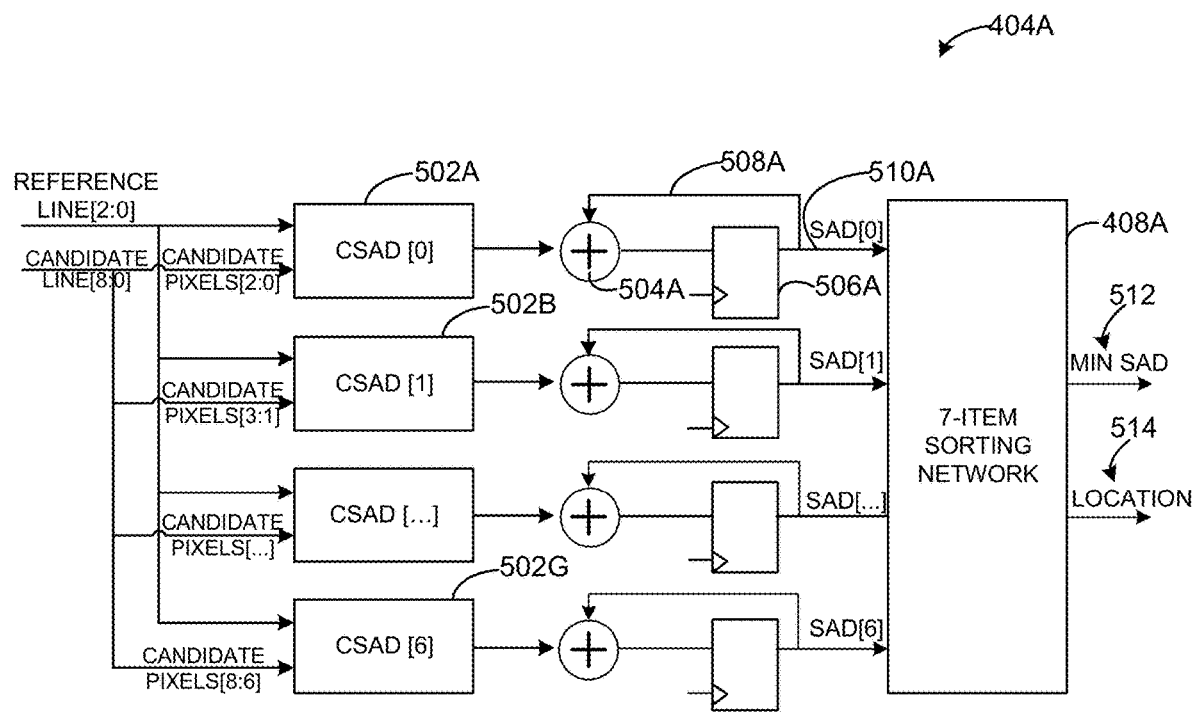
FIG. 5 is a schematic illustration of an example horizontal cost unit of the example first compare unit of FIG. 4.

FIG. 5 illustrates additional detail corresponding to the example first HCOST unit 404A of FIG. 4. In the illustrated example of FIG. 5, the first HCOST unit 404A includes a first CSAD unit 502A (labelled CSAD[0]) through a seventh CSAD unit 502G (labelled CSAD[6]) (CSAD units in the aggregate are generally referred to as CSAD units 502 or difference calculators 502). The example first CSAD unit 502A is communicatively connected to a first adder 504A, which is in turn communicatively connected to a first accumulator 506A. The example first accumulator 506A includes a first feedback path 508A to the example first adder 504A. While not illustrated in the example of FIG. 5, all CSAD units of an HCOST unit include similarly structured adders, accumulators and feedback paths. Each accumulator output for each CSAD unit 502, such as an example first output 510A of the example first accumulator 506A corresponding to the example first CSAD unit 502A, is communicatively connected to the example sorting network 408A. The example sorting network 408A includes a minimum sum of absolute differences (SADs) output 512 indicative of a minimum SAD value calculated by a respective one of the CSAD units 502. The example sorting network 408A also includes a location output 514 indicative of pixel location values associated with the minimum CSAD value output 512.

As described above, the example hardware evaluator 202 of FIG. 2 determines whether hardware parameters are known. The example first compare unit 400 of FIG. 4 and/or the example first HCOST unit 404A of FIG. 5 illustrate example hardware parameters that are analyzed by the example hardware evaluator 202 to, in part, identify capabilities of the example image analysis system 100. In the event the example hardware evaluator 202 determines that details associated with the hardware are not known (e.g., current hardware parameters are not located and/or otherwise delineated in a storage location of the example image analyzer 102), the example hardware evaluator 202 identifies a search span value (e.g., +/−3-pixels in an x and y direction) and a macroblock size (e.g., 3-pixels in an x-direction, 3-pixels in a y-direction). The example search area determiner 204 calculates search area values in a manner consistent with example Equations 1A and 1B.

$$SA(width)=(2*\text{search span in } x \text{ direction})+(\text{width of macroblock}) \qquad \text{Equation 1A.}$$

$$SA(height)=(2*\text{search span in } y \text{ direction})+(\text{height of macroblock}) \qquad \text{Equation 1B.}$$

In the illustrated example of Equations 1A and 1B, SA refers to the search area width or height, such as the example search area width and height values of FIG. 3A. To illustrate in view of the example search span of +/−3-pixels and a macroblock width of 3-pixels, example Equation 1 reveals a search area of 81 pixels, which is shown in the illustrated example of FIG. 3A. In particular, the search area of 81 pixels refers to an equal number of rows and columns, thus the search area includes nine (9) rows and nine (9) columns.

While the example search area determiner 204 determines the search area having an equal number of rows and columns, as shown in FIG. 3A, there are a limited number of full macroblocks that are able to fit within the example search area (e.g., the example search area 302 of FIG. 3A). The search area determiner 204 calculates a number of possible macroblock rows within the search area in a manner consistent with example Equation 2.

$$\text{MB Rows}=2*(\text{SearchSpan})+1 \qquad \text{Equation 2.}$$

In the illustrated example of Equation 2, because the aforementioned example includes a search span of 3-pixels, the number of macroblock rows is calculated as a value of seven (7). The number of possible macroblock rows capable of fitting within the example search area is illustrated in FIG. 3B, in which a full macroblock can be placed within rows 0 (the first row 312) through row 6 (a seventh row 314). However, in the event the example macroblock 308B (see dashed macroblock) is placed with its reference pixel 310 on an eighth row 316, then example macroblock 308B would not fit within the example search area 302. In other words, any macroblock placed in the example eighth row 316 would result in an overhang of missing pixels 330 that are beyond the evaluation boundary of the example search area 302.

In some examples, a number of CSAD units in a given implementation (e.g., an available processing device) is fixed. Depending on search area selections, different quantities of CSAD units may be employed during analysis efforts. In the event a search area exceeds a needed number of CSAD units, examples disclosed herein enable multiple iterations to fully search a search area of interest. In other examples, in the event a search area of interest is relatively smaller in view of a number of available CSAD units, examples disclosed herein enable operation(s) with some CSAD units remaining idle. Determining a number of macroblock rows is important to determine a corresponding number of difference calculators (CSAD units) used within each HCOST unit, such as the example difference calculators 502 of FIG. 5. The example difference calculator quantity determiner 206 determines a quantity of difference calculators used based on the number of macroblock rows that can fit within the example search area. Because every difference calculator includes a corresponding accumulator, a corresponding number of accumulators is also known when based on a determined number of macroblock rows that can fit within the example search area. The example HCOST quantity determiner 208 determines a quantity of HCOST units used based on the macroblock height. In the non-limiting example discussed herein, because the macroblock height is 3-pixels, the corresponding number of HCOST units is three, which is shown as HCOST[0] (404A), HCOST[1] (404B) and HCOST[2] (404C) of FIG. 4.

In some examples, the hardware evaluator 202 proceeds to compare images based on available hardware resources, while in some examples the hardware evaluator 202 allocates hardware resources as, for example, FPGA circuits. In some examples, the hardware evaluator 202 invokes FPGA circuit configuration to allocate a particular number of HCOST units, a particular number of difference calculators, etc. In some examples, the hardware resources are one or more ASICs having a particular number of HCOST units and/or difference calculators.

Continuing with the example first mode of operation for the example image analyzer 102 that employs the example first compare unit 400 of FIG. 4 and example HCOST units (e.g., the example first HCOST unit 404A) of FIG. 5, the example image retriever 210 retrieves a candidate image of interest to be analyzed. The example macroblock engine 212 retrieves and/or otherwise selects a macroblock of interest, which may include a reference image or portion of an image of the candidate image to be searched. As described above, the candidate image may be a framed scene having a car image therein, and the example reference image may be a portion of that car (e.g., a wheel of the car). The example macroblock engine 212 labels rows and pixel references of the example macroblock, such as the example macroblock 308 of FIGS. 3C and 3D. The example search area engine 214 selects a search area of interest from the retrieved candidate image and labels rows and pixel references thereof (e.g., see the example search area 302 of FIGS. 3A and 3B).

Figure 6:
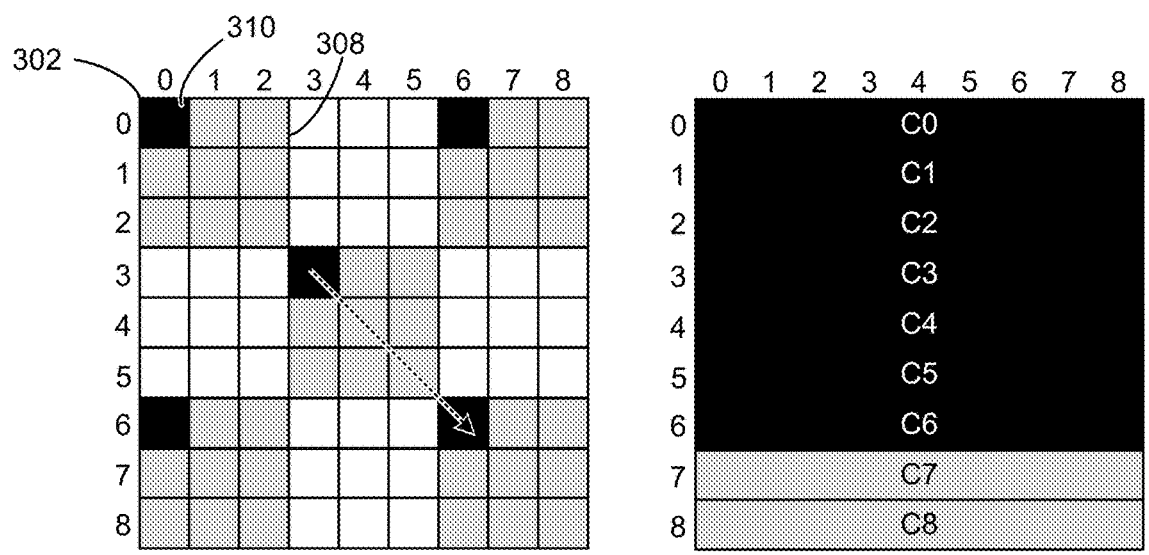
FIG. 6 is a schematic illustration of the example search area of FIGS. 3A and/or 3B showing candidate rows.

The example search area engine 214 identifies and/or otherwise labels candidate rows of the example search area 302, as shown on the right-hand side of FIG. 6. In the illustrated example of FIG. 6, candidate rows C0 through C6 represent particular rows of the example search area 302 that can fit the example reference pixel 310 of a full macroblock 308. In the illustrated example of FIG. 6, candidate rows C7 and C8 do not contain reference pixels 310 because doing so would cause only a partial representation of the macroblock 308 within the example search area 302 (e.g., resulting in an overhang of missing pixels 330, as shown in FIG. 3B).

Figure 7:
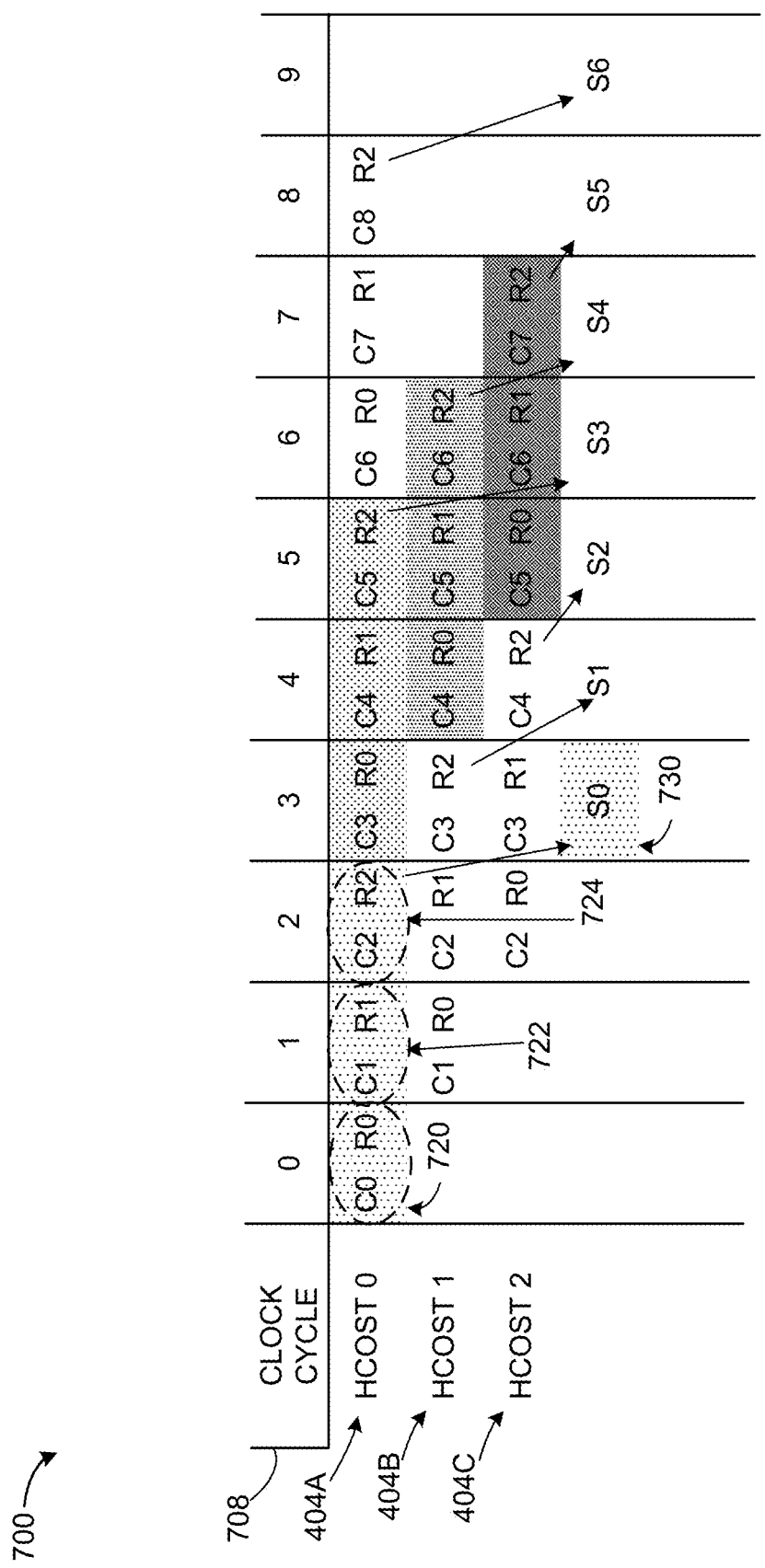
FIG. 7 is a timing diagram of an example first mode of operation corresponding to the example first compare unit of FIG. 4.

FIG. 7 illustrates an example first mode of operation timing diagram 700 of the example image analyzer 102 and corresponding first compare unit 400 operation for the example 3-pixel by 3-pixel macroblock example discussed herein. In the illustrated example of FIG. 7, the timing diagram 700 includes the first HCOST unit (HCOST 0) 404A, the second HCOST unit (HCOST 1) 404B, and the third HCOST unit (HCOST 2) 404C. The example timing diagram 700 also includes a row of clock cycles 708 (clock cycles 0 through 9) to illustrate operation of respective HCOST units when performing comparisons between candidate rows (e.g., C0) and respective reference rows (e.g., R0). For example, during a first clock cycle (clock cycle 0) 710, the example first HCOST unit 404A compares a first reference row R0 to incremental positions within the example first candidate row C0. In particular, when considering the 3×3 example discussed herein, the first clock cycle invokes a quantity of seven (7) difference calculators (e.g., CSAD[0] 502A through CSAD[6] 502G) to calculate (in parallel) difference values at the different overlapping positions of the first reference row R0 on the example first candidate row C0.

Figure 8A:
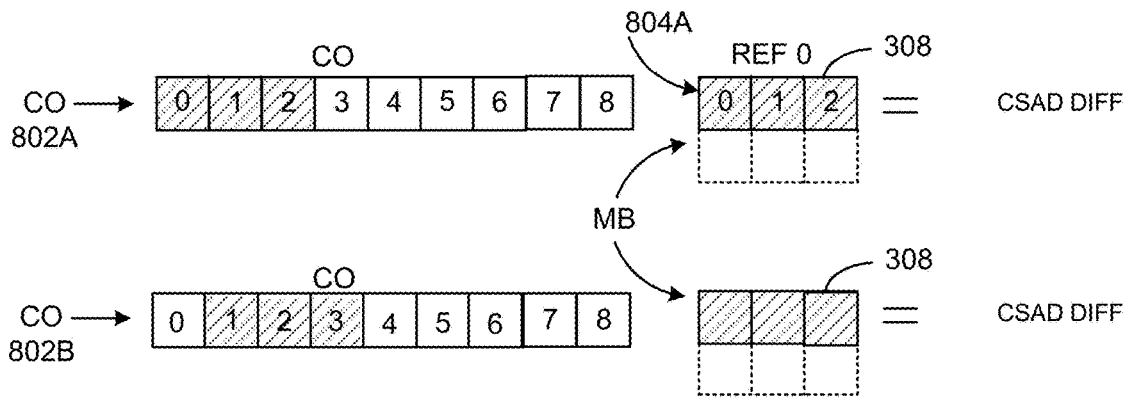
FIGS. 8A-8C are graphical representations of difference calculations corresponding to the example first mode of operation.

To illustrate example operation of the first mode of operation of the example image analyzer 102 and respective difference calculators of the example first HCOST unit 404A, FIG. 8A illustrates a graphical representation of a difference calculation between a first candidate row C0 802A and the first reference row R0 804A of the reference macroblock 308. In particular, the first difference calculator CSAD[0] 502A calculates pixel value differences therebetween for pixels 0, 1 and 2 (shaded) of the first candidate row C0 802A during the first clock cycle (clock cycle 0). FIG. 8A also illustrates the first candidate row C0 802B with respect to difference calculations by the second difference calculator CSAD[1] 502B. The second difference calculator CSAD[1] 502B calculates pixel value differences between pixels 1, 2 and 3 (unlike pixels 0, 1 and 2 that were the focus of CSAD[0] 502A) of the first candidate row C0 802B and the same three pixels (R0) of the reference macroblock 308 during the first clock cycle. Stated differently, respective difference calculators (difference calculators CSAD[0] 502A through CSAD[6] 502G) are responsible for incremental shifts of the candidate row C0 from left to right, and the resulting difference values of each incremental shift. For the sake of explanation convenience, only the first two difference calculators of FIG. 8A are explained in this example for the first clock cycle of the first HCOST unit 404A.

Figure 8B:
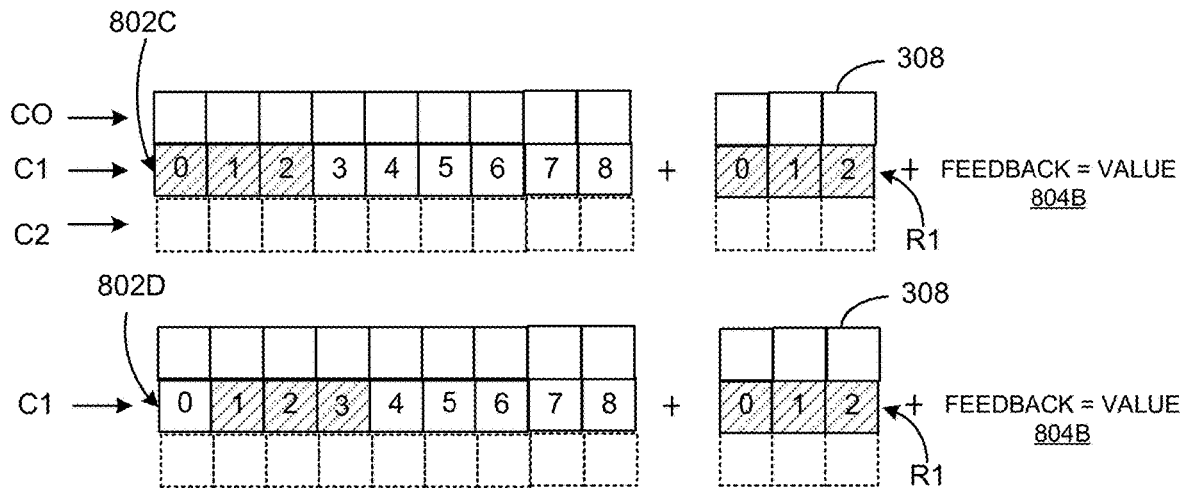

Returning to the illustrated example of FIG. 7, while the first clock cycle 710 described above performed a comparison of pixels between (a) a first candidate row C0 and (b) a first row R0 804A of the reference macroblock (see dashed circle 720), a second (subsequent) clock cycle proceeds to perform pixel comparisons of additional candidate rows (e.g., C1) and additional rows of the reference macroblock (e.g., R1) (see dashed circle 722). To illustrate, FIG. 8B illustrates a graphical representation of a difference calculation between a second candidate row C1 802C and a second reference row R1 804B of the reference macroblock 308. During this second clock cycle (clock cycle 1), the first difference calculator CSAD[0] 502A of HCOST[0] 404A calculates pixel value differences between pixels 0, 1 and 2 of the second candidate row C1 802C, and pixels 0, 1 and 2 of the second row R1 804B of the reference macroblock 308. However, because the difference calculator 502A needs an alternate row (e.g., R1) of the reference macroblock (as compared to the first row R0 during the first clock cycle described above), inputs to the example first compare unit 400 must be rotated by the example barrel line shifter 410 at the onset of this second clock cycle (clock cycle 1). Similarly, during this second clock cycle the example second difference calculator CSAD[1] 502B calculates pixel value differences between pixels 1, 2 and 3 (an incremental shift to the right) of the second candidate row C1 802D and the same three pixels 0, 1 and 2 of the second row R1 804B. As described above, only two of the difference calculators (e.g., CSAD[0] 502A and CSAD[1] 502B) are illustrated above in FIG. 8B, but the remaining difference calculators (e.g., CSAD[2] through CSAD[6] 502G) proceed in a similar manner to calculate difference values between C1 and R1 in an incremental shift from left to right.

Figure 8C:
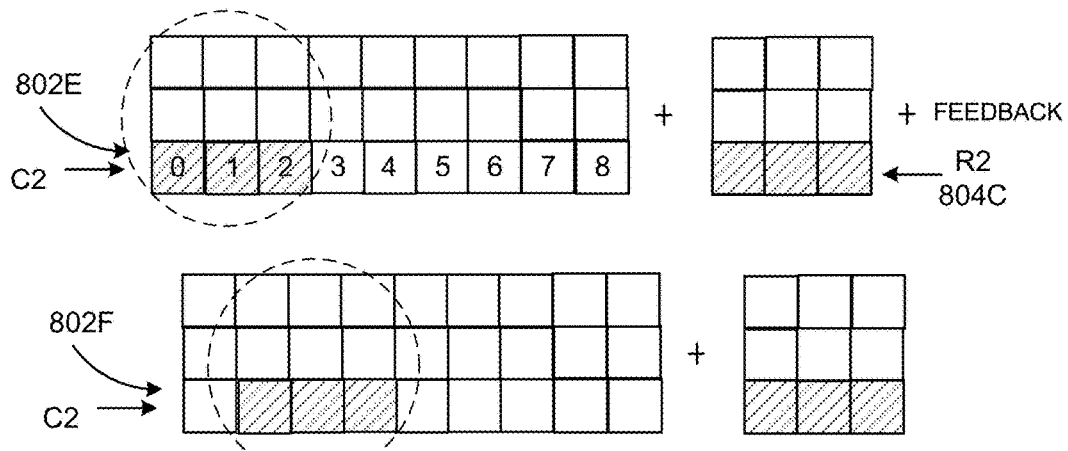

At this point in the example operation of the first mode of operation, two clock cycles (clock cycle 0 and clock cycle 1) have occurred to process two full candidate rows (C0 and C1) against two rows of the reference macroblock (R0 and R1). However, a full reference macroblock (e.g., the example macroblock 308) has not yet been analyzed within the search area (e.g., the search area 302) and a third clock cycle is required (see dashed circle 724 of FIG. 7) to accomplish a complete scan and comparison of candidate rows C0, C1 and C2. FIG. 8C illustrates a graphical representation of a difference calculation between a third candidate row C2 802E of the search area 302 and a third reference row R2 804C of the reference macroblock 308. During this third clock cycle (clock cycle 2), the first difference calculator CSAD[0] 502A calculates pixel value differences between pixels 0, 1 and 2 of the third candidate row C2 802E and pixels 0, 1 and 2 of the third row R2 804C of the reference macroblock 308. However, similar to the transition between the first clock cycle (clock cycle 0) and the second clock cycle (clock cycle 1) described above, this instant transition from the second clock cycle (clock cycle 1) to the third clock cycle (clock cycle 2) applies a different row of the reference macroblock. As such, the inputs to the example first compare unit 400 must be rotated by the example barrel line shifter 410 at the onset of this third clock cycle. Similarly, during this third clock cycle the example second difference calculator CSAD[1] 502B calculates pixel value differences between pixels 1, 2 and 3 (an incremental shift to the right) of the third candidate row C2 802F. At this point in the example operation of the first mode of operation, a full reference macroblock 308 has been analyzed within the search area for a number of candidate rows equal to the number of rows in the macroblock. In the illustrated example of FIG. 7, a non-overlapping set of candidate rows "S" is a completed search area portion of the example search area 302. In the illustrated example of FIG. 7, a first completed non-overlapping set of candidate rows is shown as "S0" 730.

Figure 9:
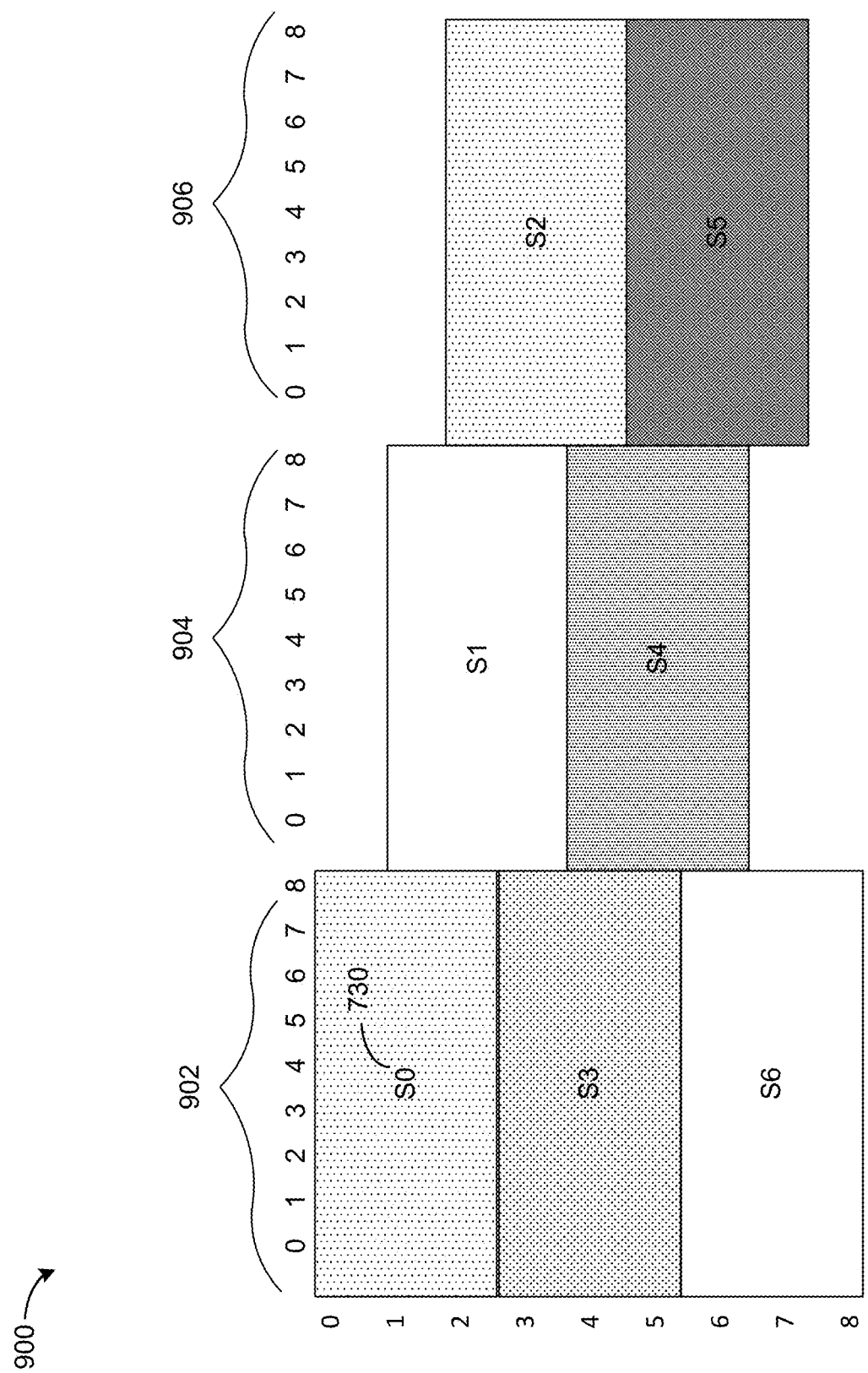
FIG. 9 is an example search area map illustrating non-overlapping sets of candidate rows.

FIG. 9 is an example search area map 900 showing the example search area 302 three separate times in an adjacent layout. In particular, the example search area map 900 includes a first search area portion 902 (including non-overlapping set of candidate rows S0, S3 and S6), a second search area portion 904 (including non-overlapping set of candidate rows S1 and S4), and a third search area portion 906 (including non-overlapping set of candidate rows S2 and S5). The example first completed non-overlapping set of candidate rows S0 730 is shown in the first search area portion 902, in which S0 has performed a comparison for all of candidate rows C0, C1 and C2 with respect to the reference macroblock 308. The example search area engine 214 determines, after each clock cycle, whether a non-overlapping set of candidate rows (S) is complete. If not, then the example difference calculator engine 218 increments a row to analyze (e.g., from C0 to C1, from R0 to R1, etc.), and a new set of pixels is applied as an input to the example HCOST module(s) after a barrel shift rotation by the example barrel shift engine 220.

Worth noting is that at the end of each clock cycle the example feedback engine 222 activates the example feedback path (e.g., feedback path 508A of FIG. 5) for the corresponding difference calculator (e.g., CSAD[0] 502A). Generally speaking, each difference calculator, such as the example first CSAD unit 502A, calculates a difference value for one row of the reference macroblock (e.g., R1) and retains a value of a previous row (e.g., R0), if any, via the example feedback path 508A. Accordingly, when all rows (e.g., R0, R1 and R2) of the reference block have been used to perform comparisons on the search area, the example sorting engine 216 applies and/or otherwise provides the accumulated sum-of-absolute difference (SAD) values for each particular difference calculator to the example sorting network 408A.

The example sorting engine 216 determines a relative lowest value and corresponding location. In particular, the example sorting engine 216 considers all difference calculator values in an effort to find the one having the lowest relative value, which is indicative of the closest match of the reference macroblock image to the candidate source image. Such minimum values and corresponding location information is forwarded to an example motion vector (MV) calculator 450, as shown in the illustrated example of FIG. 4. The example MV calculator calculates the MV based on a pixel coordinate of the macroblock within the search area with the lowest accumulated difference, and compares all groupings of non-overlapping sets of rows (S0 through S6) to find an absolute minimum difference value and its corresponding location. Stated differently, the example sorting engine 216 determines which one of the 49 possible locations of the macroblock 308 within the example search area 302 has the closest match. In view of the above-disclosed example where the macroblock 308 is a wheel of a vehicle that is located in a particular portion of the search area 302, such a match would identify a location of that wheel. As such, in the event a prior location of the wheel was located in a different location within an image of interest (e.g., the search area 302), then the new location of that wheel identifies the occurrence of motion of the vehicle within the image of interest.

Briefly returning to the illustrated example of FIG. 7, which is indicative of the first mode of operation of the example image analyzer 102, the example disclosed above considered only the first three clock cycles (clock cycles 0, 1 and 2) associated with HCOST[0] 404A. At the end of those three clock cycles, the first non-overlapping set of candidate rows (S0, which includes candidate rows C0, C1 and C2) were analyzed by the example compare unit 400 of FIG. 4. However, as shown in the illustrated example of FIG. 7, additional HCOST units are invoked during successive clock cycles in a similar manner to evaluate other non-overlapping sets of candidate rows (i.e., S1 through S6). Worth noting, as described above, each effort to evaluate and identify a relatively lowest SAD value for respective non-overlapping sets of candidate rows requires additional rotation efforts and accumulator feedback (e.g., the example feedback path 508A of FIG. 5) efforts. Stated differently, during the first three clock cycles of the example first HCOST unit (HCOST[0] 404A), the example barrel line shifter 410 rotates pixels as an input to the HCOST unit from R0 to R1 (see clock cycle 0 to clock cycle 1), rotates pixels as an input from R1 to R2 (see clock cycle 1 to clock cycle 2), and then must rotate pixels as an input from R2 back to R0 (see clock cycle 2 to clock cycle 3). Also worth noting in reference to the example first mode of operation is that each of the example HCOST units in the illustrated example of FIG. 4 includes a corresponding sorting unit (e.g., the example first sorting unit 408A corresponding to the example first HCOST unit 404A, the example second sorting unit 408B corresponding to the example second HCOST unit 404B, and the example third sorting unit 408C corresponding to the example third HCOST unit 404C).

Figure 10:
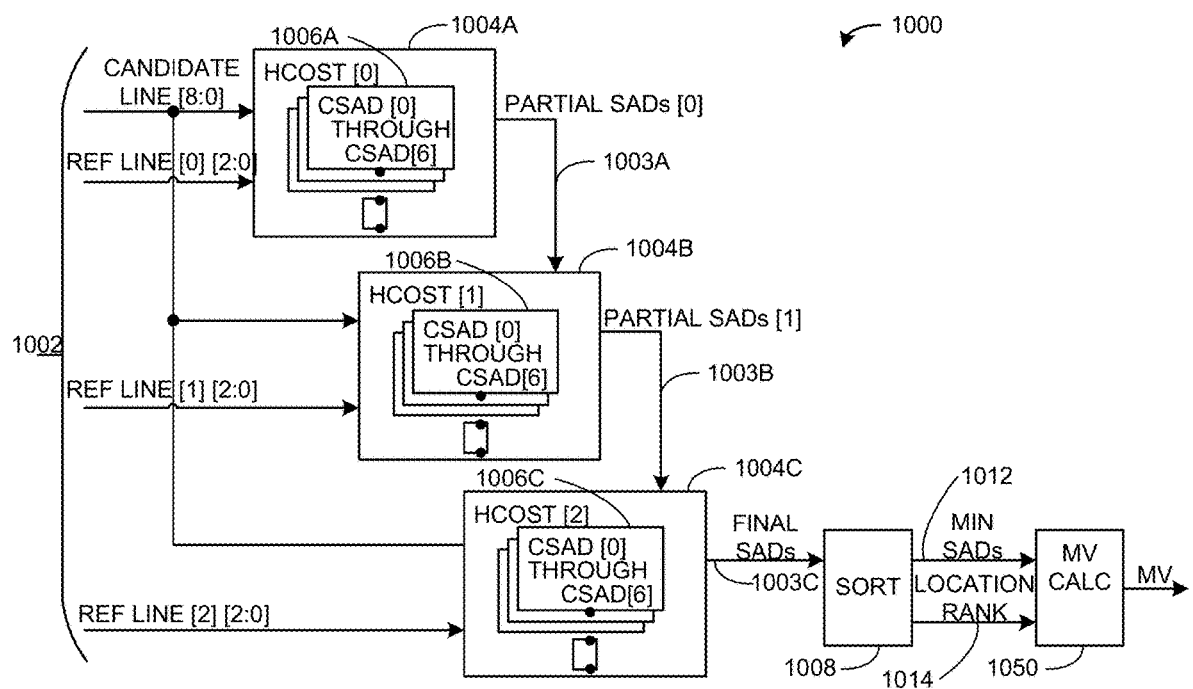
FIG. 10 is a schematic illustration of an example second compare unit of the example image analysis system of FIG. 1.

To reduce a number of processing cycles devoted to pixel rotation and/or feedback paths, to reduce a hardware footprint of the example compare units, and to reduce dynamic power consumption by reducing an amount of data movement (e.g., removing barrel shifter task(s) as described in further detail below), a second mode of operation of the example image analyzer 102 is disclosed below to identify features within an image. FIG. 10 is a schematic illustration of an example second compare unit 1000. In the illustrated example of FIG. 10, the compare unit 1000 is hardware located in the example processing resources 114 of FIG. 1, while in some examples the second compare unit 1000 is hardware located in the example image analyzer 102. In some examples, the second compare unit 1000 is an ASIC, while in some examples the second compare unit 1000 is one or more FPGA resources. In some examples, the image analyzer 102 invokes particular FPGA resources in a manner consistent with input characteristics (e.g., resolution values of the example video sources 104, pixel window search area constraints/settings, frame rate expectations of an application, etc.).

In the illustrated example of FIG. 10, the second compare unit 1000 includes pixel inputs 1002 that include pixel data from example video sources 104 of FIG. 1 and/or the example image retriever 210 of FIG. 2. The example second compare unit 1000 of FIG. 10 includes HCOST units 1004. Continuing with the above-identified example of a 3×3 reference macroblock 308 and the example 9×9 search area 302 (an example for purposes of explanation and not limitation), the illustrated example second compare unit 1000 of FIG. 10 includes an example first HCOST unit 1004A, an example second HCOST unit 1004B, and an example third HCOST unit 1004C (generally referred to herein in the aggregate as HCOST units 1004). Similar to the example first compare unit 400 of FIG. 4, the quantity of HCOST units in the illustrated example of FIG. 10 is based on a height of the reference macroblock. Each HCOST unit 1004 includes a quantity of CSAD units 1006. In particular, the example first HCOST unit 1004A includes respective first CSAD units 1006A, the example second HCOST unit 1004B includes respective second CSAD units 1006B, and the example third HCOST unit 1004C includes respective third CSAD units 1006C.

Figure 11:
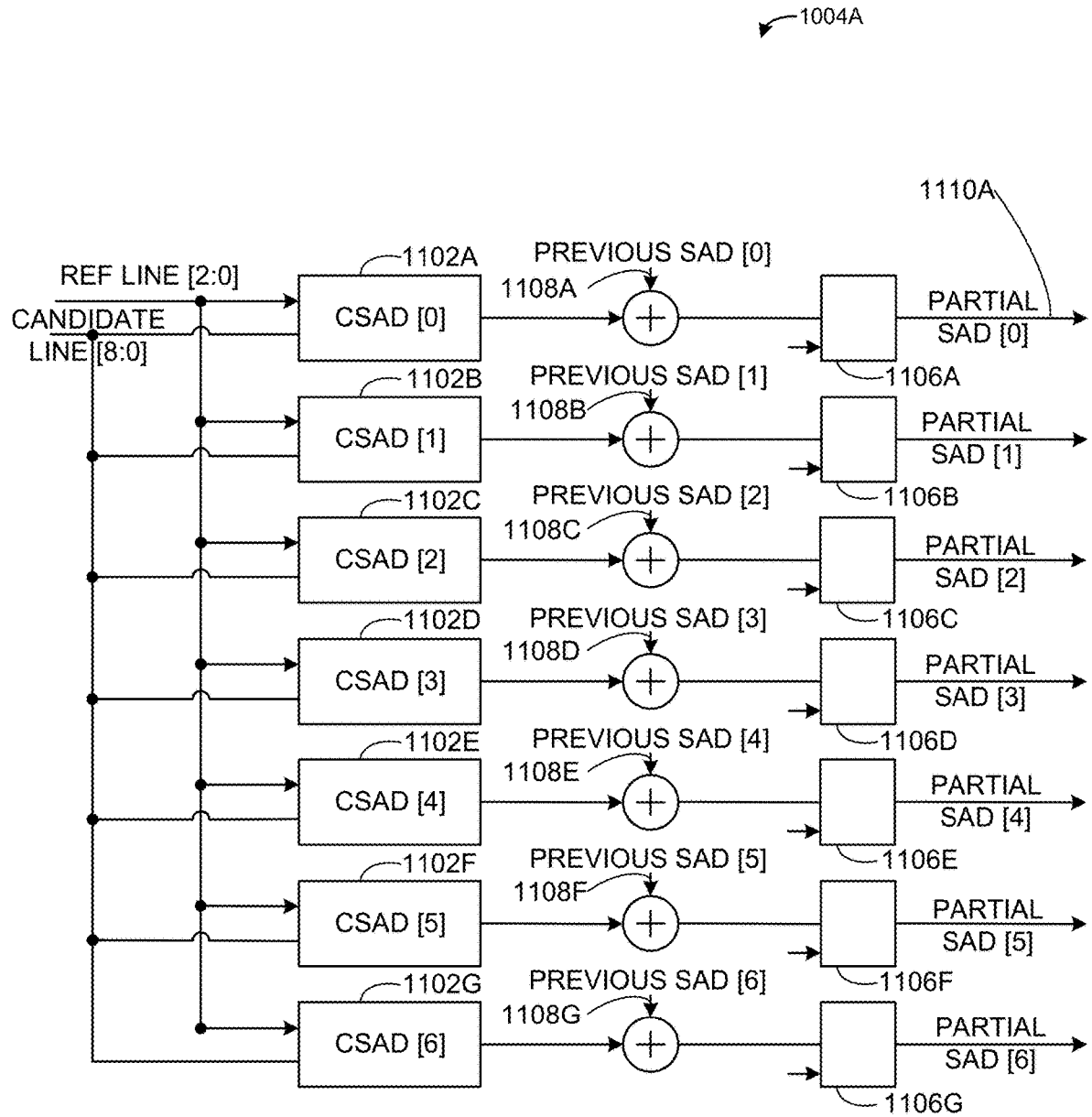
FIG. 11 is a schematic illustration of an example horizontal cost unit of the example second compare unit of FIG. 10.

FIG. 11 illustrates additional detail corresponding to the example first HCOST unit 1004A of FIG. 10. In the illustrated example of FIG. 11, the first HCOST unit 1004A includes a first CSAD unit 1102A (labelled CSAD[0]) through a seventh CSAD unit 1102G (labelled CSAD[6]) (CSAD units in the aggregate are generally referred to as CSAD units 1102 or difference calculators 1102). The example first CSAD unit 1102A is communicatively connected to a first adder 1104A, which is in turn communicatively connected to a first accumulator 1106A. While not illustrated in the example of FIG. 11, all CSAD units of an HCOST unit include similarly structured adders and accumulators. Output values of the example first accumulator 1106A are routed to an example first partial SAD line 1110A.

Unlike the example first compare unit 400 of FIG. 4, outputs 1003 of respective HCOST units 1004 of the illustrated example of FIG. 10 are cascaded such that the outputs of one HCOST unit are provided as inputs to a subsequent HCOST unit. As such, values from respective partial SAD lines (e.g., the example first partial SAD line 1110A of FIG. 11) are provided as inputs to respective previous SAD lines 1108, such as an example first previous SAD line 1108A of FIG. 11. At least one benefit of the aforementioned example hardware configuration of the cascading HCOST units is that feedback paths (e.g., the example feedback path 508A of FIG. 5) are not needed, and rotation effort(s) with the barrel shifter are not needed, thereby saving computational cycles and/or energy when evaluating pixel information. In some examples where underlying hardware includes one or more barrel shifters for rotation tasks, examples disclosed herein enable bypassing rotation task(s) and/or otherwise bypassing hardware associated with such rotation task(s) (e.g., bypassing barrel shifter(s)). Stated differently, examples disclosed herein bypass rotating a first row of pixels of a macroblock when cascading SAD values from one HCOST unit to another. Additionally, unlike the example first compare unit 400 of FIG. 4, the example second compare unit 1000 of FIG. 10 does not include and/or otherwise eliminates the need for a barrel line shifter, such as the example barrel line shifter 410 of FIG. 4. As such, computational cycles, processing power and hardware footprint sizes are reduced in connection with the illustrated example second compare unit 1000 of FIG. 10 and the example HCOST unit architecture 1004 of FIG. 11.

Figure 12:
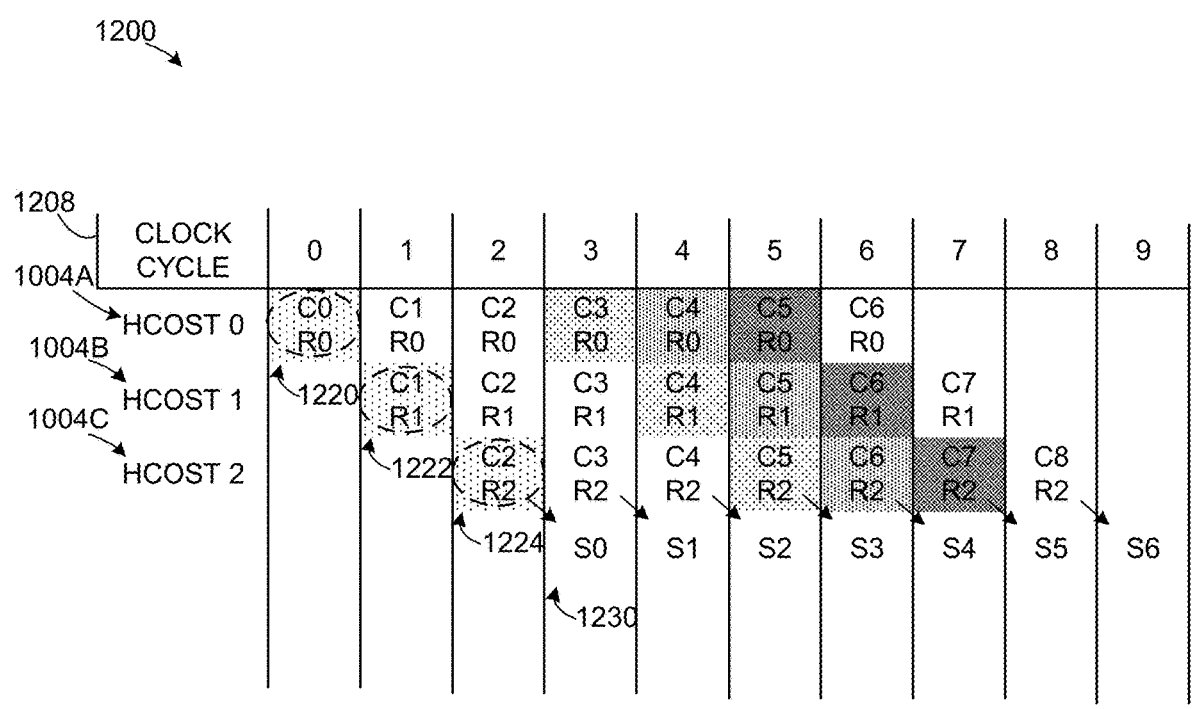
FIG. 12 is a timing diagram of an example second mode of operation corresponding to the example second compare unit of FIG. 10.

To illustrate operation of the example second compare unit 1000 of FIG. 10 and the associated example HCOST units 1004 (e.g., the example first HCOST unit 1004A, the example second HCOST unit 1004B and the example third HCOST unit 1004C) of FIGS. 10 and 11, an example second mode of operation timing diagram 1200 is shown in FIG. 12. In the illustrated example of FIG. 12, the timing diagram 1200 includes the example first HCOST unit (HCOST 0) 1004A, the example second HCOST unit (HCOST 1) 1004B, and the example third HCOST unit (HCOST 2) 1004C. Similar to the illustrated example of FIG. 7, the example second mode of operation timing diagram 1200 of FIG. 12 includes a row of clock cycles 1208 (clock cycles 0 through 9) to illustrate operation of respective HCOST units when performing comparisons between candidate rows and reference rows.

Similar to the example timing diagram 700 of FIG. 7, in the illustrated example of FIG. 12 there are three clock cycles consumed to compare pixels from a first non-overlapping set of candidate rows S0 1230. In particular, the example difference calculator engine 218 calculates: (a) pixel difference values between candidate row C0 and reference row R0 (see dashed circle 1220) during the first clock cycle (clock cycle 0), (b) pixel difference values between candidate row C1 and reference row R1 (see dashed circle 1222) during the second clock cycle (clock cycle 1), and (c) pixel difference values between candidate row C2 and reference row R2 (see dashed circle 1224) during the third clock cycle (clock cycle 2). During these three clock cycles, all three HCOST units participate to compare pixels for the first non-overlapping set of candidate rows S0 1230, unlike the illustrated example of FIG. 7. As such, SAD values from each participating HCOST unit are cascaded to the next HCOST unit, thereby eliminating any need for pixel rotation with a barrel shifter. Stated differently, the example difference calculator constrains the inputs of the respective difference calculators in any particular HCOST unit to evaluate only one row of pixels of the macroblock.

Worth noting is that each example HCOST unit in the illustrated example of FIG. 12 (and the associated second compare unit 1000 of FIG. 10 and the associated CSAD architecture of FIG. 11) only takes one row as an input during comparison efforts for all clock cycles. The macroblock row to each HCOST unit is constant and reduces data movement and, as a result, power consumption. That is, the example first HCOST unit 1004A only processes reference row R0, the example second HCOST unit 1004B only processes reference row R1, and the example third HCOST unit 1004C only processes reference row R2, thereby improving computational efficiency by avoiding any need for pixel rotation (e.g., via a barrel shifter).

Additionally, all overlapping sets of candidate rows S0 through S6 are ultimately determined with a last HCOST unit (see HCOST[2] 1004C in FIG. 12) due to the cascading architecture of the example second compare unit 1000 of FIG. 10, which obviates a need to include redundant sorting units (e.g., the individual sorting units 408A, 408B and 408C of FIG. 4) within each HCOST unit (as is the case in the illustrated example of FIG. 4). Instead, because SAD determinations from respective HCOST units are cascaded to a subsequent HCOST unit, the example second compare unit 1000 of FIG. 10 only requires a single sorting unit 1008. The example single sorting unit 1008 includes a corresponding SAD output 1012 and a location output 1014, which feeds an example MV calculator 1050. Accordingly, the particular architecture of the example second compare unit 1000 of FIG. 10 and associated timing diagram 1200 of FIG. 12 facilitate further computational resource reductions, power savings and hardware size reductions.

Figure 13A:
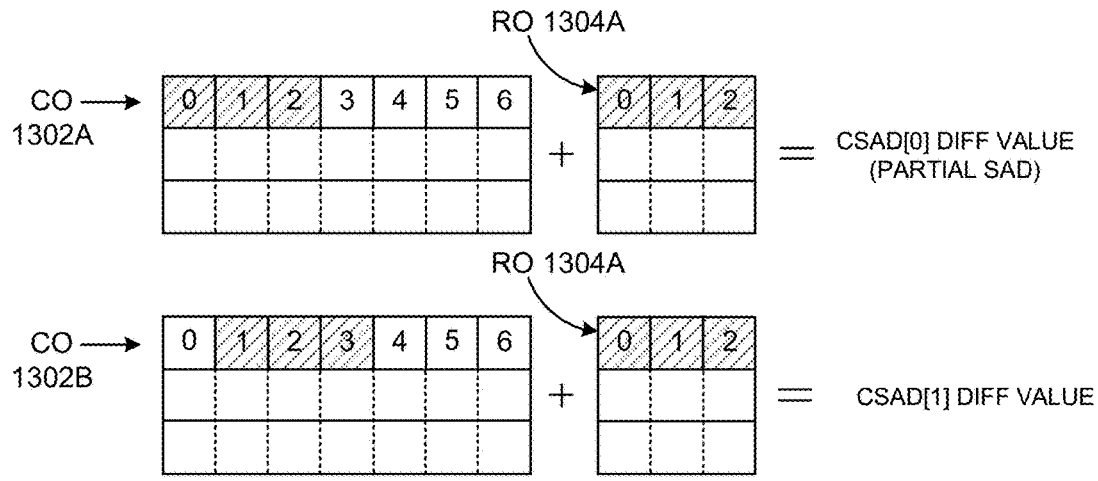
FIG. 13A-13C are graphical representations of difference calculations corresponding to the example second mode of operation.

Further illustration of the example second mode of operation of the example image analyzer 102 and respective difference calculators of the example HCOST units is shown in FIG. 13A. FIG. 13A illustrates a graphical representation of difference calculations between candidate row C0 1302 and the first reference row R0 1304 of the reference macroblock 308. In particular, the example first CSAD[0] 1002A calculates pixel value differences therebetween for pixels 0, 1 and 2 (shaded) of the first candidate row C0 1302A during the first clock cycle (clock cycle 0). FIG. 13A also illustrates the first candidate row C0 1302B with respect to difference calculations by the second difference calculator CSAD[1] 1002B. The second difference calculator CSAD[1] 1002B calculates pixel value differences between pixels 1, 2 and 3 (unlike pixels 0, 1 and 2 that were the focus of CSAD[0] 1002A) of the first candidate row C0 1302B and the same three pixels (R0) of the reference macroblock 308 during the first clock cycle.

As described above, respective difference calculators (difference calculators CSAD[0] 1002A through CSAD[6] 1002G) are responsible for incremental shifts of the candidate row C0 from left to right, and the resulting difference values of each incremental shift. For the sake of explanation convenience, only the first two difference calculators of FIG. 13A are explained in this example for the first clock cycle of the first HCOST unit 1004A. However, as can be seen in the illustrated example of FIG. 11, additional CSAD units may operate in parallel, each of which is focused on a separate shifted grouping of pixels for the candidate row of interest.

Returning to the illustrated example of FIG. 12, while the first clock cycle (clock cycle 0) described above performed a comparison of pixels between (a) a first candidate row C0 and (b) a first row R0 1304A of the reference macroblock (see dashed circle 1220), a second (subsequent) clock cycle (clock cycle 1) proceeds to perform pixel comparisons of additional candidate rows (e.g., C1) and additional rows of the reference macroblock (e.g., R1) (see dashed circle 1222). Additionally, during the second cycle the first row R0 is still compared against candidate row C1 at the same time as a comparison between the second row R1 and candidate row C1 (and so on as shown in FIG. 12). However, unlike the illustrated example of FIG. 7 in which the first mode of operation evaluates S0 using the same HCOST unit during all three clock cycles (thereby requiring pixel rotation via the example barrel shifter 410), the additional rows of the reference macroblock (e.g., R1) and candidate row C1 in the illustrated example of FIG. 12 employ a cascaded HCOST unit (see dashed circle 1222 and associated HCOST1 1004B).

Figure 13B:
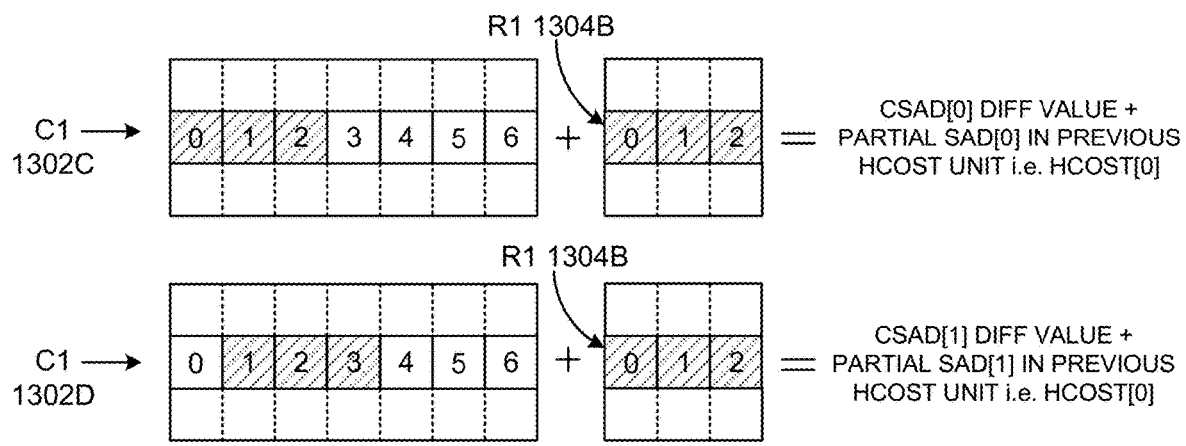

In the illustrated example of FIG. 13B, a graphical progression from analysis of C0 and R0 (see dashed circle 1220) to the analysis of C1 and R1 is shown (see dashed circle 1222). In the illustrated example of FIG. 13B, a first difference calculator of the second HCOST unit 1004B is used to evaluate pixels (e.g., cells 0, 1 and 2) between the second candidate row C1 1302C and the second row R1 1304B of the reference macroblock. Similarly, a second difference calculator of the second HCOST unit 1004B is used to evaluate pixels between a right-shifted portion (e.g., cells 1, 2 and 3) of the second candidate row C1 1302D and the second row R1 1304B of the reference macroblock.

Figure 13C:
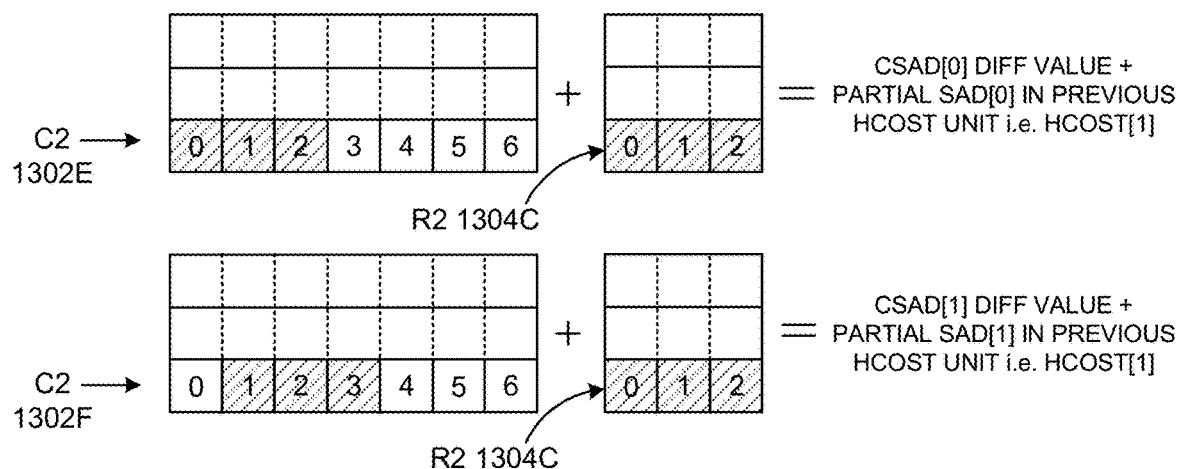

In the illustrated example of FIG. 13C, a graphical progression from analysis of C1 and R1 (see dashed circle 1222) to the analysis of C2 and R2 is shown (see dashed circle 1224). In the illustrated example of FIG. 13C, a first difference calculator of the third HCOST unit 1004C is used to evaluate pixels (e.g., cells 0, 1 and 2) between the third candidate row C2 1302E and the third row R2 1304C of the reference macroblock. Similarly, a second difference calculator of the third HCOST unit 1004C is used to evaluate pixels between a right-shifted portion (e.g., cells 1, 2 and 3) of the third candidate row C2 1302F and the third row R2 1304C of the reference macroblock.

Briefly returning to the illustrated example of FIG. 12, after the example search area engine 214 determines that all non-overlapping rows of the search area have been evaluated and corresponding SAD values calculated, the example sorting engine 216 invokes the sorting unit 1008 of FIG. 10 to identify a corresponding overall minimum SAD value and transmits such value via the example SAD output 1012. Additionally, the example sorting unit 1008 identifies a corresponding pixel location information associated with the minimum SAD value and transmits such location information via the example location output 1014. Thus, pixel location information regarding where a reference image is located is determined by examples disclosed herein. Furthermore, the determined location information may be compared to additional location information at a subsequent evaluation of the source image (or video) during a later time. Differences in such location information from one time to the next confirms movement of an object within the source image. Additionally, analysis of the location information from one time to the next allows identification of a direction of such movement.

While an example manner of implementing the image analyzer 102 of FIGS. 1 and 2 is illustrated in FIGS. 1-13, one or more of the elements, processes and/or devices illustrated in FIG. 1-13 may be combined, divided, re-arranged, omitted, eliminated and/or implemented in any other way. Further, the example hardware evaluator 202, the example search area determiner 204, the example difference calculator quantity determiner 206, the example HCOST quantity determiner 208, the example image retriever 210, the example macroblock engine 212, the example search area engine 214, the example sorting engine 216, the example difference calculator engine 218, the example barrel shift engine 220, the example feedback engine 222, the example HCOST engine 224, the example compare unit(s) 400, the example difference calculators 406, 502, the example adders 504, the example accumulators 506, the example sorting networks 408, 1008, the example minimum value calculators 450, 1050 and/or, more generally, the example image analyzer 102 of FIGS. 1-13 may be implemented by hardware, software, firmware and/or any combination of hardware, software and/or firmware. Thus, for example, any of the example hardware evaluator 202, the example search area determiner 204, the example difference calculator quantity determiner 206, the example HCOST quantity determiner 208, the example image retriever 210, the example macroblock engine 212, the example search area engine 214, the example sorting engine 216, the example difference calculator engine 218, the example barrel shift engine 220, the example feedback engine 222, the example HCOST engine 224, the example compare unit(s) 400, the example difference calculators 406, 502, the example adders 504, the example accumulators 506, the example sorting networks 408, 1008, the example minimum value calculators 450, 1050 and/or, more generally, the example image analyzer 102 of FIGS. 1-13 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example hardware evaluator 202, the example search area determiner 204, the example difference calculator quantity determiner 206, the example HCOST quantity determiner 208, the example image retriever 210, the example macroblock engine 212, the example search area engine 214, the example sorting engine 216, the example difference calculator engine 218, the example barrel shift engine 220, the example feedback engine 222, the example HCOST engine 224, the example compare unit(s) 400, the example difference calculators 406, 502, the example adders 504, the example accumulators 506, the example sorting networks 408, 1008, the example minimum value calculators 450, 1050 and/or, more generally, the example image analyzer 102 of FIGS. 1-13 is/are hereby expressly defined to include a non-transitory computer readable storage device or storage disk such as a memory, a digital versatile disk (DVD), a compact disk (CD), a Blu-ray disk, etc. including the software and/or firmware. Further still, the example image analyzer 102 of FIGS. 1 and 2 may include one or more elements, processes and/or devices in addition to, or instead of, those illustrated in FIGS. 1-13, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 14:
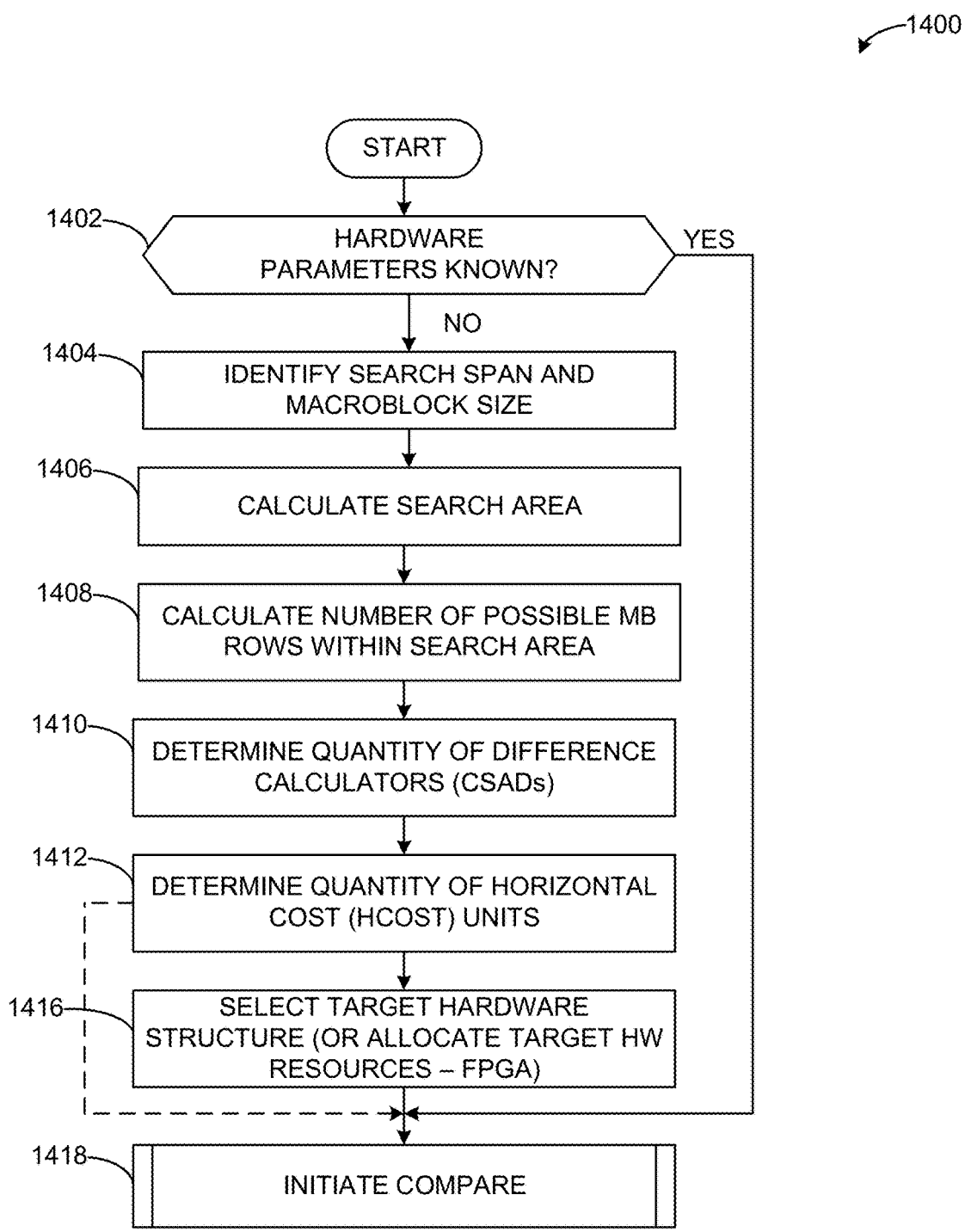
FIGS. 14-16 are flowcharts representative of machine readable instructions which may be executed to implement the example image analyzer of FIGS. 1 and 2.
Figure 15:
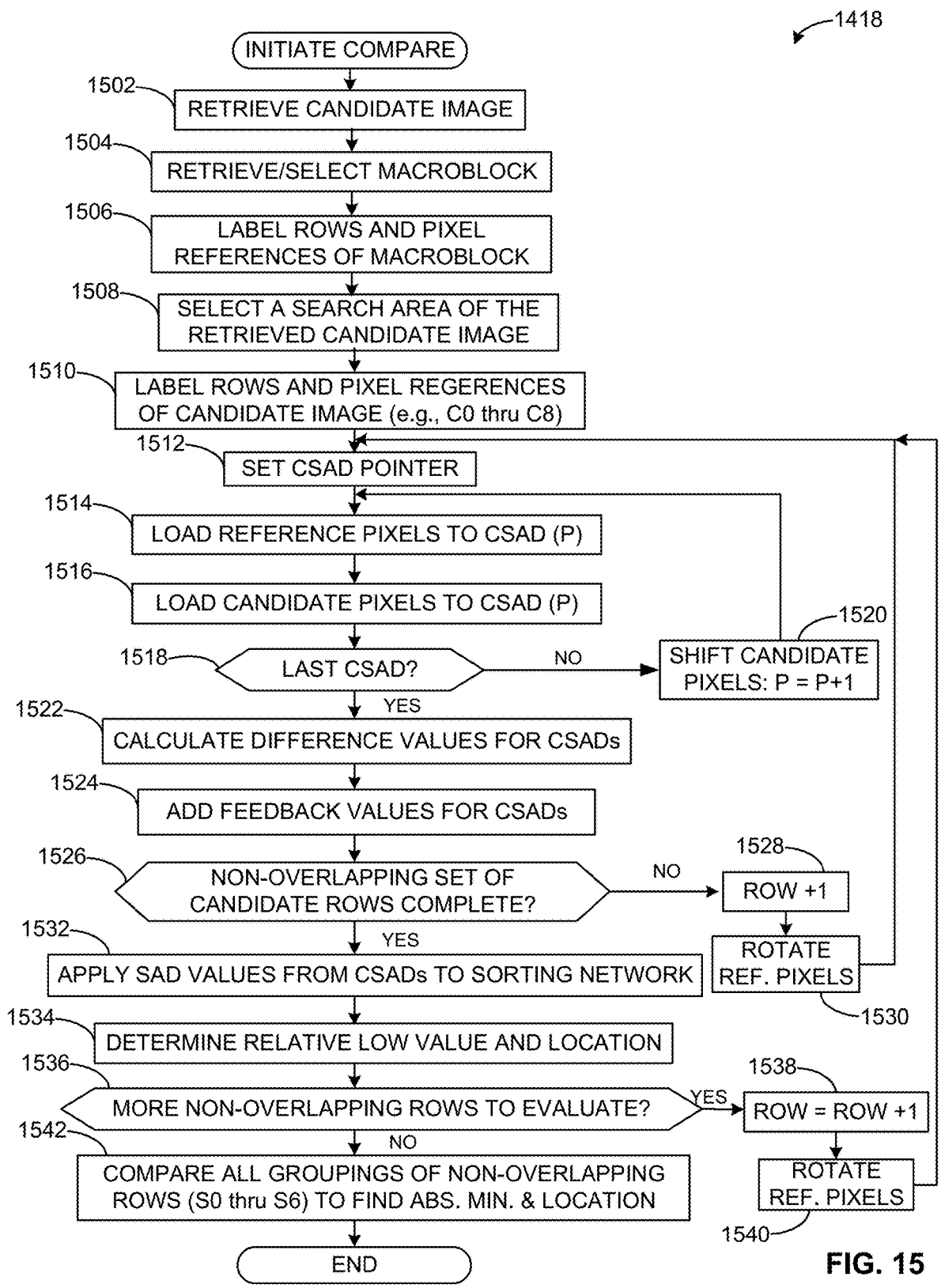
Figure 16:
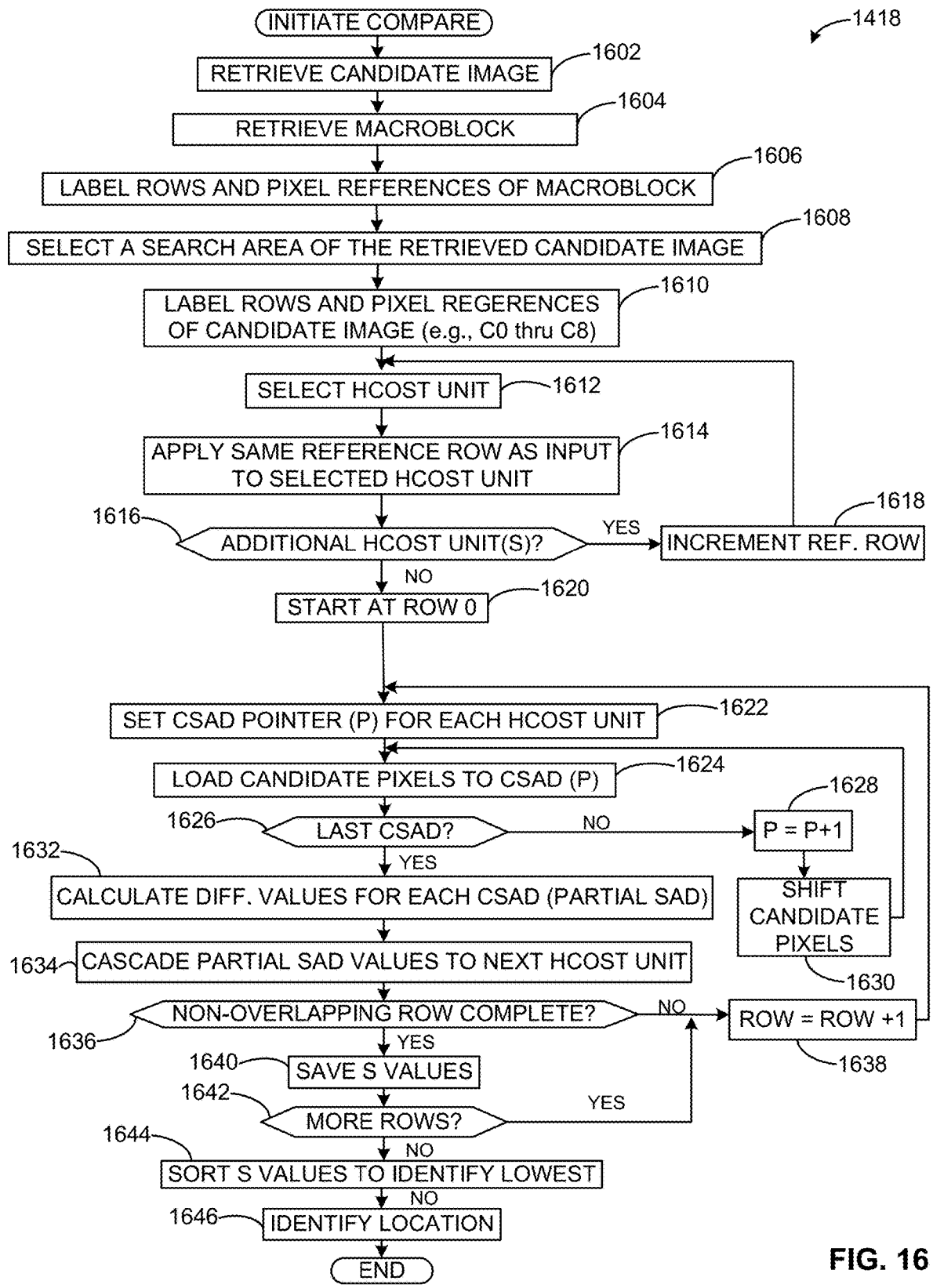

Flowcharts representative of example hardware logic, machine readable instructions, hardware implemented state machines, and/or any combination thereof for implementing the image analyzer 102 of FIGS. 1-13 are shown in FIGS. 14-16. The machine readable instructions may be one or more executable program or portion(s) of an executable program(s) for execution by a computer processor such as the processor 1712 shown in the example processor platform 1700 discussed below in connection with FIG. 17. The program(s) may be embodied in software stored on a non-transitory computer readable storage medium such as a CD-ROM, a floppy disk, a hard drive, a DVD, a Blu-ray disk, or a memory associated with the processor 1712, but the entire program and/or parts thereof could alternatively be executed by a device other than the processor 1712 and/or embodied in firmware or dedicated hardware. Further, although the example program(s) is/are described with reference to the flowcharts illustrated in FIGS. 14-16, many other methods of implementing the example image analyzer 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directing readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instruction on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or program(s) regardless of the particular format or state of the machine readable instructions and/or program(s) when stored or otherwise at rest or in transit.

As mentioned above, the example processes of FIGS. 14-16 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The example program 1400 of FIG. 14 includes block 1402, in which the example hardware evaluator 202 determines whether hardware parameters are known. For example, in the event the image analyzer 102 has performed one or more analysis and location operations on previous occasions, then further efforts to perform underlying hardware detection and/or characterization efforts can be avoided. Information associated with hardware parameters may be stored in a memory of the example hardware evaluator 202, stored in a memory of the example processing resources 114 and/or stored in a memory of the example processor platform 1700 of FIG. 17. In the event the example hardware evaluator 202 determines that the hardware parameters are known (block 1402) (e.g., available in a stored memory), then control advances to block 1418, as described in further detail below.

In the event the example hardware evaluator 202 determines that the hardware parameters (e.g., including information related to image size) are not known and/or otherwise unavailable (block 1402), then the example hardware evaluator 202 identifies a search span and a macroblock size (block 1404). As described above, in some examples the size and location of the search area is a function of the image size (e.g., if searching in a bottom left corner of an image, the search area may be truncated due to reaching a border of the image). The example search area determiner 204 calculates a search area based on the identified search span and macroblock size (block 1406) in a manner consistent with example Equations 1A and 1B, as well as within a manner consistent with the image size and location of a reference macroblock within the image. Without limitation, one or more additional and/or alternate inputs may be used to guide search area operation(s). In some examples, pyramidal successive elimination techniques may be used to more efficiently identify search area operation(s), in which sensor/camera inputs may be used to more accurately define particular portions of an image to be searched. Such example pyramidal successive elimination techniques may afford greater analysis efficiency as compared to, for example, raster-based analysis efforts (e.g., "raster mode") in which predefined portions of an image are analyzed regardless of their likelihood of having changing pixel activity. Additionally, the example search area determiner 204 calculates a number of possible macroblock rows within the calculated search area (block 1408) in a manner consistent with example Equation 2.

To determine a quantity of difference calculators (CSADs) to be used, the example difference calculator quantity determiner 206 considers the calculated number of macroblocks that can fit within a row within the example search area (block 1410). The number of needed CSADs is a function of the width of the macroblock and the width of the search area, as described above. Stated differently, some computational efficiencies may be realized by performing pixel analysis tasks in parallel, when possible (e.g., when such hardware resources can accommodate parallelism). As such, the quantity of difference calculators is, in some examples, equal to the quantity of macroblock rows that can fit within the example search area. As described above, different quantities and arrangements of difference calculators make up HCOST units. The example HCOST quantity determiner 208 determines a quantity of HCOST units based on the macroblock height (block 1412). In some examples, the hardware evaluator 202 selects target hardware structures and/or other hardware resources (e.g., quantities of HCOST units, particular types of HCOST units, etc.) (block 1416) and proceeds to compare images based on such available hardware resources (block 1418). As described above, in some examples the hardware evaluator 202 allocates hardware resources that are needed based on the above-identified analysis (block 1416), such as allocating particular FPGA resources to facilitate a particular number and/or type of HCOST units, CSADs, etc.

FIG. 15 illustrates additional detail associated with initiating compare activities of block 1418. In the illustrated example of FIG. 15, pixel analysis and comparison are described in connection with a first mode of operation for the example image analyzer 102 that employs the example first compare unit 400 of FIG. 4 and the example HCOST units of FIG. 5. As described above, the example first mode of operation follows the example timing diagram 700 of FIG. 7. The example image retriever 210 retrieves a candidate image of interest to be analyzed (block 1502), and the example macroblock engine 212 retrieves and/or otherwise selects a macroblock of interest, which may include a reference image or portion of an image of the candidate image to be searched (block 1504). Generally speaking, there are always at least two images, in which a reference image is being searched-for in a main image. Within the reference image, one or more macroblocks can be extracted that will be searched (e.g., MBs can be extracted via raster mode, obtaining a list of image coordinates, etc.). As such, MBs are extracted from the reference image, and a search area is selected from the candidate image in which the best match is found between the MBs and the reference image. The example macroblock engine 212 labels rows and pixel references of the example macroblock (block 1506), such as the example macroblock 308 of FIGS. 3C and 3D, and the example search area engine 214 selects a search area of interest from the retrieved candidate image and labels rows and pixel references thereof (block 1508) (e.g., see the example search area 302 of FIGS. 3A and 3B). The example search area engine 214 identifies and/or otherwise labels candidate rows of the search area (block 1510) (e.g., the example search area 302), as shown on the right-hand side of FIG. 6.

The illustrated example of FIG. 15 is described in connection with one HCOST unit (e.g., the example HCOST unit 404A of FIGS. 4 and 5), but the example comparison program 1418 of FIG. 15 applies to any number of HCOST units for a given pixel analysis task. The example difference calculator engine 218 sets a CSAD pointer (P) to manage and/or otherwise control the input loading of one CSAD unit (block 1512), such as the example CSAD[0] 502A of FIG. 5. The example difference calculator engine 218 loads reference pixels to the CSAD unit associated with the pointer (P) (block 1514), and loads candidate pixels to that same CSAD unit (block 1516). The example difference calculator engine 218 determines whether the CSAD unit associated with the current pointer (P) is the last CSAD unit within the HCOST unit of interest (block 1518). For example, considering the first HCOST unit 404A of FIG. 5, there are seven (7) CSAD units that operate in parallel, in which each CSAD unit performs a comparison for a portion of a candidate row of interest (e.g., the first CSAD unit corresponds to bits 0, 1 and 2 of a candidate row of interest, the second CSAD unit corresponds to right-shifted bits 1, 2 and 3 of the candidate row of interest, etc.). If the example CSAD unit is not the last CSAD unit for the HCOST unit of interest (block 1518), then the example barrel shift engine 220 shifts the candidate pixels of the reference macroblock and increments the pointer (P) (block 1520). Control then returns to block 1512.

In the event the example difference calculator engine 218 determines that the last CSAD unit has been loaded with input data (pixels to be compared) (block 1518), then the example difference calculator engine 218 invokes respective loaded CSAD units (e.g., the seven (7) CSAD units 502A through 502G of FIG. 5) to perform a comparison that generates a sum of absolute difference (SAD) value (block 1522). The example feedback engine 222 adds feedback values for the result (block 1524), and the example search area engine 214 determines whether a non-overlapping set of candidate rows is complete (block 1526). As described above, a non-overlapping set of candidate rows is indicative of a full macroblock having been applied to a group of candidate rows throughout a full row width, as illustrated in the example search area map 900 of FIG. 9. If not, then the example difference calculator engine 218 increments a row counter (block 1528) to cause the CSAD units to perform a load and compare on a subsequent row of interest (e.g., moving from comparison of pixels in candidate row C0 to candidate row C1, see dashed circle 722 of FIG. 7). The example barrel shift engine 220 again rotates the reference pixels (block 1530) so that the correct candidate row pixels are compared to the correct reference row pixels. Control then returns to block 1512.

In the event a non-overlapping set of candidate rows is complete and/or otherwise evaluated to determine SAD values (block 1526) (e.g., see S0 730 of FIG. 9 showing candidate rows C0, C1 and C2), then the example sorting engine 216 applies and/or otherwise forwards respective SAD values to a sorting network (block 1532), such as the example sorting network 408A of FIG. 5. As described above, the example sorting engine 216 invokes the example sorting network 408A to determine a relative low value (e.g., a relative minimum SAD value) and corresponding location of that relative low value (e.g., pixel coordinates of the low value) (block 1534). The example search area engine 214 determines if there are one or more additional non-overlapping rows to evaluate (block 1536) (e.g., see additional non-overlapping sets of candidate rows S1 through S6 of FIG. 9) and if so, the example difference calculator engine 218 increments a row counter (block 1538) to cause subsequent rows of the search area of interest to be loaded and compared. The example barrel shift engine 220 rotates the reference pixels (block 1540), and control returns to block 1512. However, in the event that all non-overlapping rows of the search area of interest have been evaluated (e.g., pixel values loaded and compared to the reference block for all possible positions of the reference block within the search area) (block 1536), then the example sorting engine 216 compares all such groupings of the non-overlapping rows to determine an overall minimum value and location thereof (block 1542). Stated differently, each S-value (e.g., S0 through S6) represents a local minimum for a particular grouping of candidate rows that have been compared to the reference macroblock. As such, because the reference macroblock corresponds to the portion of the image to be identified for possible evidence of movement within a scene (e.g., a frame from a movie scene), then only one S-value can be the absolute minimum.

While the above example comparison of images 1418 of FIG. 15 corresponds to the example first mode of operation of the example image analyzer 102, the illustrated example program 1418 of FIG. 16 corresponds to the second mode of operation of the example image analyzer 102. As described above, the example first mode of operation invokes and/or otherwise utilizes the example first compare unit 400 of FIG. 4 and the corresponding CSAD units of FIG. 5, while the example second mode of operation invokes and/or otherwise utilizes the architecture of the example second compare unit 1000 of FIG. 10 and the corresponding CSAD units of FIG. 11. The example second mode of operation corresponds to the example timing diagram 1200 of FIG. 12.

In the illustrated example of FIG. 16, the example image retriever 210 retrieves a candidate image of interest to be analyzed (block 1602), and the example macroblock engine 212 retrieves and/or otherwise selects a macroblock of interest, which may include a reference image or portion of an image of the candidate image to be searched (block 1604). The example macroblock engine 212 labels rows and pixel references of the example macroblock (block 1606), such as the example macroblock 308 of FIGS. 3C and 3D, and the example search area engine 214 selects a search area of interest from the retrieved candidate image and labels rows and pixel references thereof (block 1608) (e.g., see the example search area 302 of FIGS. 3A and 3B). The example search area engine 214 identifies and/or otherwise labels candidate rows of the search area (block 1610) (e.g., the example search area 302), as shown on the right-hand side of FIG. 6.

The illustrated example of FIG. 16 is described in connection with all available HCOST units of a given compare unit (e.g., the example second compare unit 1000 of FIG. 10). As described above, because all available HCOST units of a given compare unit participate in analysis of an example completed non-overlapping set of candidate rows (e.g., S0, S1, etc.), processing footprint size and processing cycles are reduced due to bypassing any need for accumulator feedback loops (e.g., the example feedback path 508). The example HCOST engine 224 selects an HCOST unit (block 1612), such as selecting a first available HCOST unit when an initial iteration of the example second compare unit 1000 of FIG. 10 is conducted. The example HCOST engine 224 applies reference row pixels to the selected HCOST unit (block 1614), such as the first row R0 of the macroblock. As described above, efficiency gains are achieved by, in part, removing any need for barrel shifter circuitry/hardware when each HCOST unit is provided a single unit row from the macroblock for all evaluation efforts of the search area of interest. The example HCOST engine 224 determines if the compare unit has additional HCOST units that have not yet been assigned a corresponding reference row input (block 1616) and, if so, a reference row pointer is incremented (block 1618). Control then returns to block 1612.

In the event the example HCOST engine 224 determines that all available HCOST units of the compare unit of interest have been assigned reference inputs (block 1616), then the example difference calculator engine 218 starts pixel comparison analysis at a first available row (row 0) (block 1620). The example difference calculator engine 218 sets a CSAD pointer (P) for each available HCOST unit at an initial value of zero to identify a first CSAD unit of the HCOST unit (block 1622). The example difference calculator engine 218 loads pixels as an input to the selected CSAD unit (block 1624) and determines whether the current CSAD unit is the last unit of the HCOST unit (block 1626). If not, one or more additional CSAD units need to be configured with input pixels for eventual comparisons with the corresponding reference pixels of the macroblock. The example difference calculator engine 218 increments the pointer (P) to refer to a next available CSAD unit (block 1628) and shifts the candidate row of pixels to the right (block 1630). Control then returns to block 1624 to load one or more inputs of additional CSAD units.

If all CSAD units have been provided candidate row pixel data (block 1626), then the example difference calculator engine 218 calculates difference values for each CSAD unit to generate a partial SAD value (block 1632). The example HCOST engine 224 cascades the partial SAD value to a next available HCOST unit (block 1634), thereby bypassing any need for accumulator feedback circuitry and associated processing cycles associated therewith. The example search area engine 214 determines whether a non-overlapping set of candidate rows is complete (evaluated) (block 1636) and, if not, the example difference calculator engine 218 increments the row pointer to focus on a next available candidate row for evaluation (block 1638) (e.g., comparisons between the pixels of the next candidate row and the row of the reference macroblock). Control then returns to block 1622.

If the example search area engine 214 determines that a non-overlapping set of candidate rows is complete (block 1636) (e.g., S0, which includes candidate rows C0, C1 and C2), then the example search area engine 214 saves corresponding partial SAD values (block 1640) (which are later sorted one time to determine a relative lowest value). The example search area engine 214 determines if there are additional rows of interest (block 1642) and, if so, control returns to block 1638. Otherwise, the example sorting engine 216 sorts the accumulated/stored S values (e.g., partial SAD values associated with S0, S1, S2, etc.) to identify a lowest relative value (block 1644). The example sorting engine 216 then determines a corresponding location (e.g., pixel coordinates on the scene of interest) that are associated with the lowest relative value (block 1646). Such information can be used from one temporal evaluation of the scene of interest to the next to identify motion and/or direction of motion of, for example, a video stream.

Figure 17:
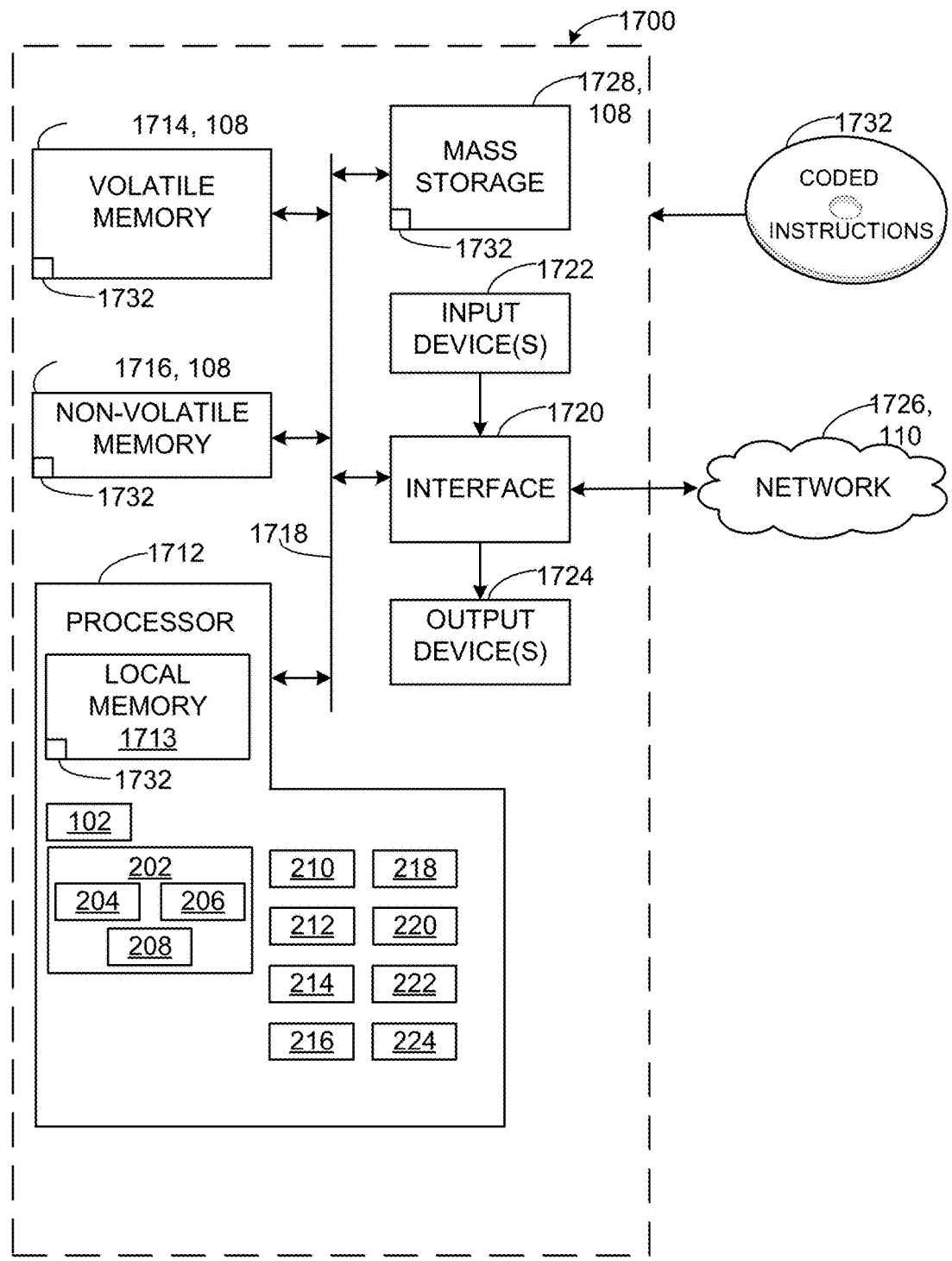
FIG. 17 is a block diagram of an example processing platform structured to execute the instructions of FIGS. 14-16 to implement the example image analyzer of FIGS. 1 and 2 to identify features within an image.

FIG. 17 is a block diagram of an example processor platform 1700 structured to execute the instructions of FIGS. 14-16 to implement the image analyzer 102 of FIGS.

1 and 2. The processor platform 1700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example hardware evaluator 202, the example search area determiner 204, the example difference calculator quantity determiner 206, the example HCOST quantity determiner 208, the example image retriever 210, the example macroblock engine 212, the example search area engine 214, the example sorting engine 216, the example difference calculator engine 218, the example barrel shift engine 220, the example feedback engine 222, the example HCOST engine 224, the example compare unit(s) 400, the example difference calculators 406, 502, the example adders 504, the example accumulators 506, the example sorting networks 408, 1008, the example minimum value calculators 450, 1050 and/or, more generally, the example image analyzer 102.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), a Bluetooth® interface, a near field communication (NFC) interface, and/or a PCI express interface.

In the illustrated example, one or more input devices 1722 are connected to the interface circuit 1720. The input device(s) 1722 permit(s) a user to enter data and/or commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1720 of the illustrated example, thus, typically includes a graphics driver card, a graphics driver chip and/or a graphics driver processor.

The interface circuit 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, redundant array of independent disks (RAID) systems, and digital versatile disk (DVD) drives.

The machine executable instructions 1732 of FIGS. 14-16 may be stored in the mass storage device 1728, in the volatile memory 1714, in the non-volatile memory 1716, and/or on a removable non-transitory computer readable storage medium such as a CD or DVD.

Additional examples of the presently described method, system, apparatus, article of manufacture and device disclosed herein include the following non-limiting configurations. Each of the following non-limiting examples may stand on its own, or may be combined in any permutation or combination with any one or more of the other examples provided below and/or throughout the present disclosure.

Example 1 includes an apparatus to improve an efficiency of image difference calculations, the apparatus comprising a horizontal cost (HCOST) engine to apply a first row of pixels of a macroblock to an input of a first HCOST unit, the first HCOST unit including a number of difference calculators, and a difference calculator engine to apply corresponding rows of pixels of a search window of a source image to corresponding ones of the number of difference calculators of the first HCOST unit, the corresponding ones of the number of difference calculators to calculate respective sums of absolute difference (SAD) values between (a) the first row of pixels of the macroblock and (b) the corresponding rows of pixels of the search window.

Example 2 includes the apparatus as defined in example 1, further including a difference calculator quantity determiner to calculate the number of difference calculators based on a quantity of instances the macroblock fits within a width of the search window of the source image.

Example 3 includes the apparatus as defined in example 1, wherein the HCOST engine is to cause the first HCOST unit to cascade the respective SAD values to a second HCOST unit without rotating the first row of pixels of the macroblock.

Example 4 includes the apparatus as defined in example 3, wherein the HCOST engine is to route cascaded SAD values corresponding to the number of difference calculators of the first HCOST unit to inputs of respective difference calculators in the second HCOST unit.

Example 5 includes the apparatus as defined in example 4, wherein the difference calculator engine is to constrain inputs of the respective difference calculators in the second HCOST unit to evaluate a second row of pixels of the macroblock.

Example 6 includes the apparatus as defined in example 1, further including a search area engine to determine if all the corresponding rows of pixels of the search window have been evaluated.

Example 7 includes the apparatus as defined in example 6, further including a sorting engine to compare the respective SAD values to identify a relative lowest one of the respective SAD values.

Example 8 includes the apparatus as defined in example 7, wherein the relative lowest one of the respective SAD values is indicative of a match between the macroblock and an image of the search window.

Example 9 includes the apparatus as defined in example 7, wherein the sorting engine is to identify a target location corresponding to the relative lowest one of the respective SAD values.

Example 10 includes the apparatus as defined in example 9, wherein the sorting engine is to identify the target location as pixel coordinates of the search window.

Example 11 includes a non-transitory computer readable medium comprising computer readable instructions that, when executed, cause at least one processor to apply a first row of pixels of a macroblock to an input of a first horizontal cost (HCOST) unit, the first HCOST unit including a number of difference calculators, apply corresponding rows of pixels of a search window of a source image to corresponding ones of the number of difference calculators of the first HCOST unit, and cascade respective sums of absolute difference (SAD) values of the corresponding ones of the number of difference calculators between (a) the first row of pixels of the macroblock and (b) the corresponding rows of pixels of the search window.

Example 12 includes the computer readable medium as defined in example 11, wherein the instructions, when executed, cause the at least one processor to calculate the number of difference calculators based on a quantity of instances of the macroblock fits within a width of the search window of the source image.

Example 13 includes the computer readable medium as defined in example 11, wherein the instructions, when executed, cause the at least one processor to cause the first HCOST unit to cascade the respective SAD values to a second HCOST unit while bypassing rotation the first row of pixels of the macroblock.

Example 14 includes the computer readable medium as defined in example 13, wherein the instructions, when executed, cause the at least one processor to route cascaded SAD values corresponding to the number of difference calculators of the first HCOST unit to inputs of respective difference calculators in the second HCOST unit.

Example 15 includes the computer readable medium as defined in example 14, wherein the instructions, when executed, cause the at least one processor to constrain inputs of the respective difference calculators in the second HCOST unit to evaluate a second row of pixels of the macroblock.

Example 16 includes the computer readable medium as defined in example 11, wherein the instructions, when executed, cause the at least one processor to determine if all the corresponding rows of pixels of the search window have been evaluated.

Example 17 includes the computer readable medium as defined in example 16, wherein the instructions, when executed, cause the at least one processor to compare the respective SAD values to identify a relative lowest one of the respective SAD values.

Example 18 includes the computer readable medium as defined in example 17, wherein the instructions, when executed, cause the at least one processor to identify a match between the macroblock and an image of the search window based on the relative lowest one of the respective SAD values.

Example 19 includes the computer readable medium as defined in example 17, wherein the instructions, when executed, cause the at least one processor to identify a target location corresponding to the relative lowest one of the respective SAD values.

Example 20 includes the computer readable medium as defined in example 19, wherein the instructions, when executed, cause the at least one processor to identify the target location as pixel coordinates of the search window.

Example 21 includes a computer implemented method to improve an efficiency of image difference calculations, the method comprising applying, by executing an instruction with at least one processor, a first row of pixels of a macroblock to an input of a first horizontal cost (HCOST) unit, the first HCOST unit including a number of difference calculators, applying, by executing an instruction with the at least one processor, corresponding rows of pixels of a search window of a source image to corresponding ones of the number of difference calculators of the first HCOST unit, and cascading, by executing an instruction with the at least one processor, respective sums of absolute difference (SAD) values of the corresponding ones of the number of difference calculators between (a) the first row of pixels of the macroblock and (b) the corresponding rows of pixels of the search window.

Example 22 includes the method as defined in example 21, further including calculating the number of difference calculators based on a quantity of instances of the macroblock fits within a width of the search window of the source image.

Example 23 includes the method as defined in example 21, further including causing the first HCOST unit to cascade the respective sad values to a second HCOST unit while bypassing rotation the first row of pixels of the macroblock.

Example 24 includes the method as defined in example 23, further including routing cascaded SAD values corresponding to the number of difference calculators of the first HCOST unit to inputs of respective difference calculators in the second HCOST unit.

Example 25 includes the method as defined in example 24, further including constraining inputs of the respective difference calculators in the second HCOST unit to evaluate a second row of pixels of the macroblock.

Example 26 includes the method as defined in example 21, further including determining if all the corresponding rows of pixels of the search window have been evaluated.

Example 27 includes the method as defined in example 26, further including comparing the respective SAD values to identify a relative lowest one of the respective SAD values.

Example 28 includes the method as defined in example 27, further including identifying a match between the macroblock and an image of the search window based on the relative lowest one of the respective SAD values.

Example 29 includes the method as defined in example 27, further including identifying a target location corresponding to the relative lowest one of the respective SAD values.

Example 30 includes the method as defined in example 29, further including identifying the target location as pixel coordinates of the search window.

Example 31 includes an apparatus to improve an efficiency of image difference calculations, the apparatus comprising means for macroblock pixel applying to apply a first row of pixels of a macroblock to an input of a first horizontal cost (HCOST) unit, the first HCOST unit including a number of difference calculators, and means for search window applying corresponding rows of pixels of a search window of a source image to corresponding ones of the number of difference calculators of the first HCOST unit, the corresponding ones of the number of difference calculators to calculate respective sums of absolute difference (SAD) values between (a) the first row of pixels of the macroblock and (b) the corresponding rows of pixels of the search window.

Example 32 includes the apparatus as defined in example 31, further including means for determining difference calculator quantities to calculate the number of difference calculators based on a quantity of instances the macroblock fits within a width of the search window of the source image.

Example 33 includes the apparatus as defined in example 31, wherein the macroblock pixel applying means is to cause the first HCOST unit to cascade the respective SAD values to a second HCOST unit without rotating the first row of pixels of the macroblock.

Example 34 includes the apparatus as defined in example 33, wherein the macroblock pixel applying means is to route cascaded SAD values corresponding to the number of difference calculators of the first HCOST unit to inputs of respective difference calculators in the second HCOST unit.

Example 35 includes the apparatus as defined in example 34, wherein the search window applying means is to constrain inputs of the respective difference calculators in the second HCOST unit to evaluate a second row of pixels of the macroblock.

Example 36 includes the apparatus as defined in example 31, further including means for search area evaluation to determine if all the corresponding rows of pixels of the search window have been evaluated.

Example 37 includes the apparatus as defined in example 36, further including means for sorting to compare the respective SAD values to identify a relative lowest one of the respective SAD values.

Example 38 includes the apparatus as defined in example 37, wherein the relative lowest one of the respective SAD values is indicative of a match between the macroblock and an image of the search window.

Example 39 includes the apparatus as defined in example 37, wherein the sorting means is to identify a target location corresponding to the relative lowest one of the respective SAD values.

Example 40 includes the apparatus as defined in example 39, wherein the sorting means is to identify the target location as pixel coordinates of the search window.

An example computer readable medium comprises first instructions that when executed cause a machine to at least one of distribute, configure, assemble, install, instantiate, retrieve, decompress, and decrypt second instructions for execution, the second instructions to, when executed, cause a machine to: apply a first row of pixels of a macroblock to an input of a first horizontal cost (HCOST) unit, the first HCOST unit including a number of difference calculators; apply corresponding rows of pixels of a search window of a source image to corresponding ones of the number of difference calculators of the first HCOST unit; and cascade respective sums of absolute difference (SAD) values of the corresponding ones of the number of difference calculators between (a) the first row of pixels of the macroblock and (b) the corresponding rows of pixels of the search window.

From the foregoing, it will be appreciated that example methods, apparatus, systems and articles of manufacture have been disclosed that identify sub-images within an image of interest. For instances, examples disclosed herein facilitate object motion detection of an image of interest where the image of interest can be a movie frame and/or live video feed of monitored activity (e.g., a security camera). A sub-image (e.g., a wheel of a car) of the image of interest (e.g., a scene including a car having wheels) is used to search the image of interest at a first time and, in the event the sub-image is detected by examples disclosed herein to be located at a second relative location within the image of interest, then object motion can be confirmed. Additionally, disclosed methods, apparatus, systems and articles of manufacture improve the efficiency of using a computing device by implementing a particular hardware configuration, timing diagram and/or process that avoids a need for extra pixel shifting operations typically associated with image analysis. For instance, examples disclosed herein avoid and/or otherwise reduce extra barrel shifting circuitry, and avoid and/or otherwise reduce extra accumulator feedback circuitry. Such unique hardware configurations and/or processes enable efficiency improvements of underlying processing resources involved in one or more image analysis techniques disclosed herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to improve an efficiency of image difference calculations, the apparatus comprising:
    horizontal cost (HCOST) engine circuitry to apply a first-row of pixels of a reference macroblock to an input of first HCOST unit circuitry, the first HCOST unit including a number of difference calculators, the reference macroblock including a second row of pixels; and
    difference calculator engine circuitry to:
        apply corresponding rows of pixels of a search window of a source image to corresponding first ones of the number of difference calculators of the first HCOST unit, the corresponding first ones of the number of difference calculators to calculate first sums of absolute difference (SAD) values between (a) the first row of pixels of the reference macroblock and (b) the corresponding rows of pixels of the search window;
        cascade the first SAD values to adder circuitry corresponding to second HCOST unit circuitry; and
        constrain an input to the second HCOST unit circuitry to include only the second row of pixels of the reference macroblock, the difference calculator circuitry to apply the corresponding rows of pixels of the search window to corresponding second ones of a number of difference calculators of the second HCOST unit circuitry.

2. The apparatus as defined in claim 1, further including difference calculator quantity determiner circuitry to calculate the number of difference calculators based on a quantity of instances the reference macroblock fits within a width of the search window of the source image.

3. The apparatus as defined in claim 1, wherein the HCOST engine circuitry is to cause the first HCOST unit circuitry to cascade the respective SAD values to the second HCOST unit circuitry without rotating the first row of pixels of the reference macroblock.

4. The apparatus as defined in claim 3, wherein the HCOST engine circuitry is to route cascaded SAD values corresponding to the number of difference calculators of the first HCOST unit to inputs of respective difference calculators in the second HCOST unit circuitry.

5. The apparatus as defined in claim 1, further including search area engine circuitry to determine if all the corresponding rows of pixels of the search window have been evaluated.

6. The apparatus as defined in claim 5, further including sorting engine circuitry to compare the respective SAD values to identify a relative lowest one of the respective SAD values.

7. The apparatus as defined in claim 6, wherein the relative lowest one of the respective SAD values is indicative of a match between the reference macroblock and an image of the search window.

8. The apparatus as defined in claim 6, wherein the sorting engine circuitry is to identify a target location corresponding to the relative lowest one of the respective SAD values.

9. The apparatus as defined in claim 8, wherein the sorting engine circuitry is to identify the target location as pixel coordinates of the search window.

10. A non-transitory computer readable medium comprising computer readable instructions that, when executed, cause at least one processor to:

apply a first row of pixels of a reference macroblock to an input of a first horizontal cost (HCOST) unit, the first HCOST unit including a number of difference calculators, the reference macroblock including a second row of pixels;

apply corresponding rows of pixels of a search window of a source image to corresponding first ones of the number of difference calculators of the first HCOST unit, the corresponding first ones of the difference calculators to calculate first sums of absolute difference (SAD) values between (a) the first row of pixels of the reference macroblock and (b) the corresponding rows of pixels of the search window; and cascade the first HCOST unit to the first SAD values to adders of a second HCOST unit by:

applying the second row of pixels of the reference macroblock to an input of the second HCOST unit and applying the corresponding rows of pixels of the search window to corresponding second ones of a number of difference calculators of the second HCOST unit.

11. The computer readable medium as defined in claim 10, wherein the instructions, when executed, cause the at least one processor to calculate the number of difference calculators based on a quantity of instances of the macroblock fits within a width of the search window of the source image.

12. The computer readable medium as defined in claim 10, wherein the instructions, when executed, cause the at least one processor to determine if all the corresponding rows of pixels of the search window have been evaluated.

13. The computer readable medium as defined in claim 12, wherein the instructions, when executed, cause the at least one processor to compare the respective SAD values to identify a relative lowest one of the respective SAD values.

14. The computer readable medium as defined in claim 13, wherein the instructions, when executed, cause the at least one processor to identify a match between the reference macroblock and an image of the search window based on the relative lowest one of the respective SAD values.

15. The computer readable medium as defined in claim 13, wherein the instructions, when executed, cause the at least one processor to identify a target location corresponding to the relative lowest one of the respective SAD values.

16. The computer readable medium as defined in claim 15, wherein the instructions, when executed, cause the at least one processor to identify the target location as pixel coordinates of the search window.

* * * * *